United States Patent [19]
Quigley et al.

[11] Patent Number: 5,580,626
[45] Date of Patent: Dec. 3, 1996

[54] HIGH STRENGTH, HIGH STIFFNESS, CURVED COMPOSITE MEMBER

[75] Inventors: Peter A. Quigley, Pocasset; Stephen Briggi, Wareham; Steven C. Nolet, Leominster, all of Mass.; James L. Gallagher, Tiverton, R.I.

[73] Assignee: Composite Development Corporation, West Wareham, Mass.

[21] Appl. No.: 516,650

[22] Filed: Aug. 18, 1995

Related U.S. Application Data

[63] Continuation of Ser. No. 237,660, May 4, 1994, abandoned, and a continuation-in-part of Ser. No. 913,594, Jul. 14, 1992, Pat. No. 5,437,899, Ser. No. 178,664, Jan. 7, 1994, and Ser. No. 191,856, Feb. 3, 1994, which is a continuation-in-part of Ser. No. 178,664.

[51] Int. Cl.$^6$ ............................................. B29D 22/00
[52] U.S. Cl. .................. 428/36.2; 428/36.3; 428/113; 428/257; 428/258; 428/259; 428/284; 428/294; 428/302; 428/408; 428/902
[58] Field of Search ................ 428/36.2, 36.3, 428/113, 257, 258, 259, 284, 294, 302, 408, 902

[56] References Cited

U.S. PATENT DOCUMENTS

| | | | |
|---|---|---|---|
| Re. 29,112 | 1/1977 | Carter | 156/175 |
| Re. 30,489 | 1/1981 | Abbott | 156/175 |
| Re. 35,081 | 11/1995 | Quigley | 428/36.2 |
| 2,602,766 | 7/1952 | Francis | 154/91 |
| 3,007,497 | 11/1961 | Shobert | 138/125 |
| 3,080,893 | 3/1963 | Craycraft . | |
| 3,256,125 | 6/1966 | Tyler | 156/184 |
| 3,489,636 | 1/1970 | Wilson | 156/426 |
| 3,561,493 | 2/1971 | Maillard et al. | 138/141 |
| 3,762,986 | 10/1973 | Bhuta et al. | 161/227 |
| 4,023,801 | 5/1977 | VanAuken | 273/90 B |
| 4,061,806 | 12/1977 | Lindler et al. | 43/18.5 |
| 4,171,626 | 10/1979 | Yates et al. | 428/902 |
| 4,178,713 | 12/1979 | Higuchi | 43/18.5 |
| 4,248,062 | 2/1981 | McLain et al. | 156/173 |
| 4,268,561 | 5/1981 | Thompson et al. | 428/111 |

(List continued on next page.)

FOREIGN PATENT DOCUMENTS

| | | |
|---|---|---|
| 2105797 | 11/1993 | Canada . |
| 0177736 | 4/1986 | European Pat. Off. . |
| 0185460 | 6/1986 | European Pat. Off. . |
| 0213816 | 11/1987 | European Pat. Off. . |
| 0402309 | 12/1990 | European Pat. Off. . |
| 0470896 | 2/1992 | European Pat. Off. . |
| 2219289 | 9/1974 | France . |
| 2501579 | 9/1982 | France . |
| 2516859 | 5/1983 | France . |
| 2689811 | 10/1993 | France . |
| 1704925 | 7/1971 | Germany . |
| 56-169810 | 6/1980 | Japan . |
| 61-132623 | 11/1984 | Japan . |

OTHER PUBLICATIONS

European Search Report dated Jan. 28, 1993, application No. EP 90 91 1104.

(List continued on next page.)

Primary Examiner—Christopher Raimund
Attorney, Agent, or Firm—Lahive & Cockfield

[57] ABSTRACT

The invention provides a tubular composite member which has a plurality of plies and a generally elongate and selectively curved axis. The plies can include helically oriented fiber components, a matrix material, and thermoplastic tubes. An intermediate layer preferably has two tri-axially braided plies arranged at selective angles relative to the member's axis and as a function of the curvature of the member. Interior and exterior plies of circumferential windings can be part of the member such that the intermediate ply is contiguous and between the interior and exterior ply. In one practice, the member can be formed into a selective shape and then cured. Alternatively, the member is formed between a thermoplastic core and a thermoplastic sheath to facilitate a secondary process of heating and bending the member into a selective axially-curved shape.

27 Claims, 8 Drawing Sheets

U.S. PATENT DOCUMENTS

| | | | |
|---|---|---|---|
| 4,612,241 | 9/1986 | Howard, Jr. | 428/294 |
| 4,625,671 | 12/1986 | Nishimura | 114/103 |
| 4,657,795 | 4/1987 | Foret | 428/36 |
| 4,668,318 | 5/1987 | Piccoli et al. | 156/149 |
| 4,699,178 | 10/1987 | Washkewicz et al. | 138/125 |
| 4,716,072 | 12/1987 | Kim | 428/212 |
| 4,759,147 | 7/1988 | Pirazzini | 43/18.5 |
| 4,791,965 | 12/1988 | Wynn | 138/146 |
| 4,840,846 | 6/1989 | Ejima et al. | 428/373 |
| 5,048,441 | 9/1991 | Quigley | 114/90 |
| 5,188,872 | 2/1993 | Quigley | 428/36.2 |
| 5,290,904 | 3/1994 | Colvin et al. | 428/68 |

OTHER PUBLICATIONS

R. Monks, (1992), "Two Trends in Composites", *Plastics Technology*, pp. 40–45, Mar. 1992.

"TPI Tips, News and Tips for Pultruded Thermoplastic Composites", Thermoplastic Pultrusions, Inc. V.2–No. 3, May 1992 (1 page).

"TPI Tips, News and Tips for Pultruded Thermoplastic Composites", Thermoplastic Pultrusions, Inc. V.2–No. 4, Jul. 1992 (1 page).

"TPI Tips, News and Tips for Pultruded Thermoplastic Composites", Thermoplastic Pultrusions, Inc. V.2–No. 5, Sep. 1992 (1 page).

"TPI Tips, News and Tips for Pultruded Thermoplastic Composites", Thermoplastic Pultrusions, Inc. V.1–No. 2, Nov. 1991 (1 page).

"A New Generation of High–Strength Engineered, Composite Structural Shapes", *The technology exists today at Alcoa/Goldsworthy Engineering*, ALCOA/Goldsworthy Engineering, 23930 Madison St. Torrance, CA. *(no date available)*.

Sanders, K. J., (1988) *Organic Polymer Chemistry*, 2nd Edition, Chapman & Hill, pp. 203.

Norton Company, Plastics & Synthetics Division, "Tygon Tubing", Bulletin T–104, Norton Performance Plastics, Akron, Ohio, pp. 3–26. (no date available).

Rose, (1966), *The Condensed Chemical Dictionary*, 7th Edition, Reinhold Publishing Corporation, pp. 684, 759, 760.

"Advanced Production Systems for Composites", *The Shape of Things to Come*, Goldsworthy Engineering, Inc. (no date available).

Thermoplastic Pultrusions, Inc. publication, not dated, citing New Developments (8 pages).

European Search Report mailed Jan. 4, 1994 during prosecution of EP 93/111 187.

International Search Report mailed Sep. 22, 1995 during prosecution of PCT/US95/05083.

European Search Report mailed Oct. 2, 1995 during prosecution of EP 100159.3.

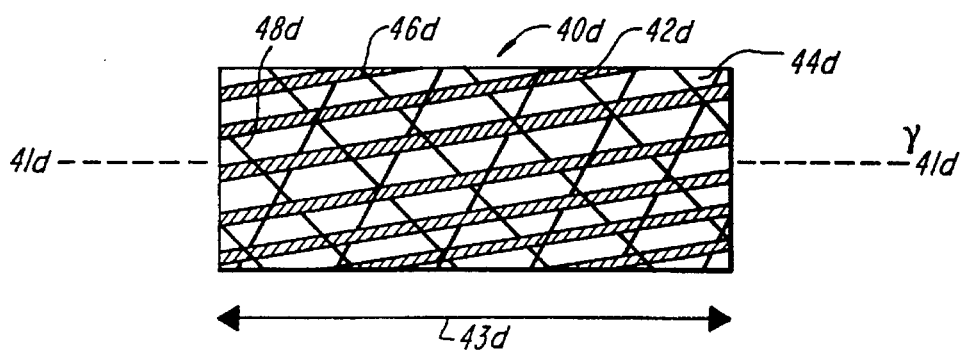
FIG. 2D
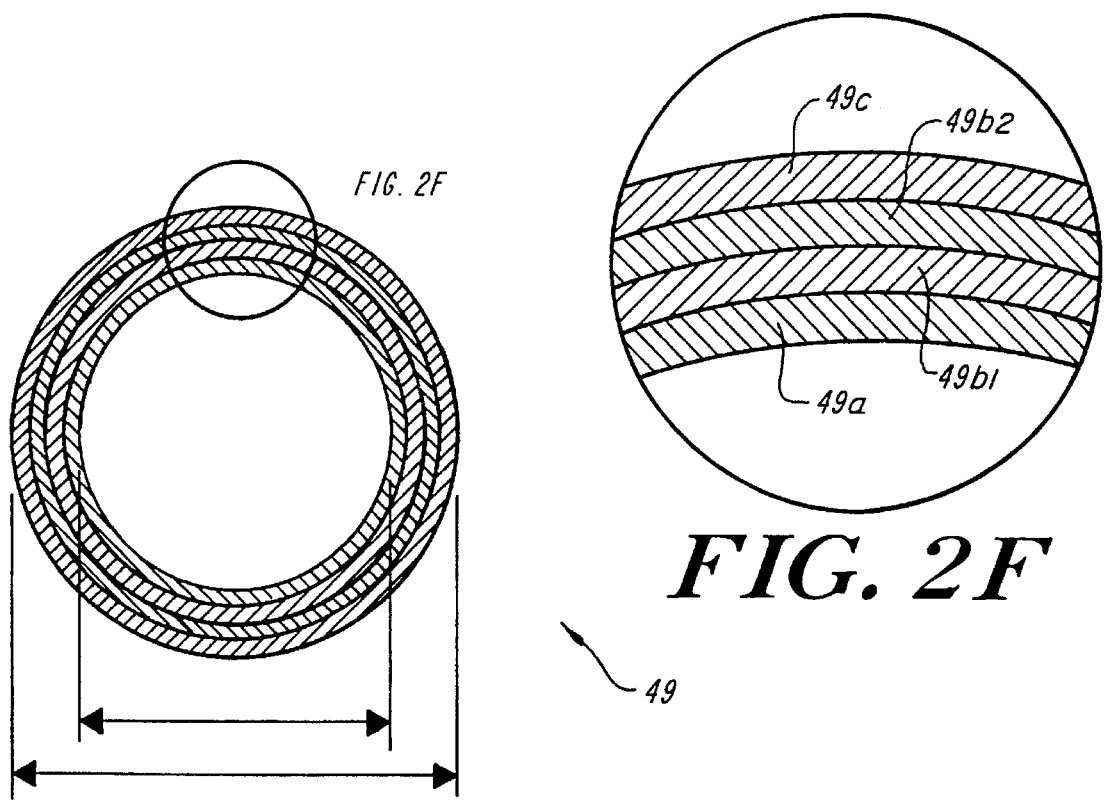
FIG. 2F
FIG. 2E

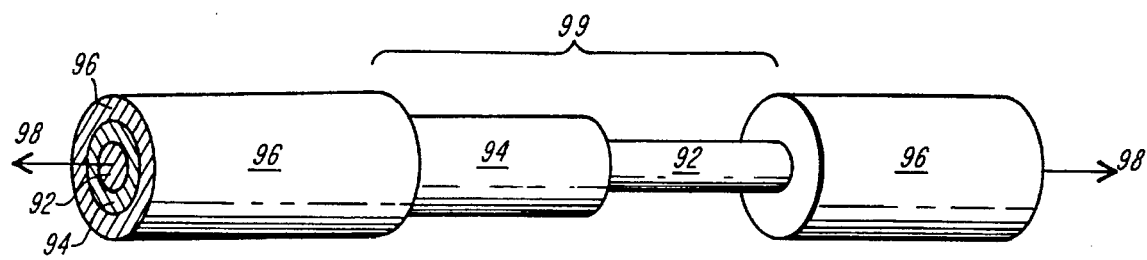
FIG. 4
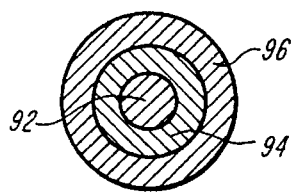
FIG. 4A
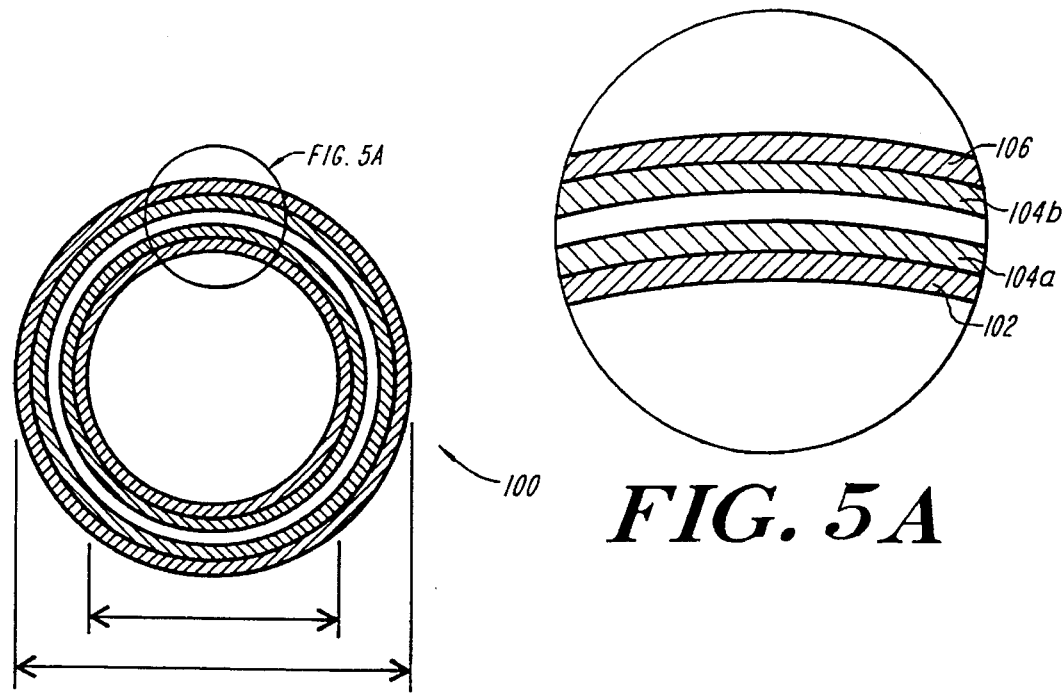
FIG. 5
FIG. 5A

HIGH STRENGTH, HIGH STIFFNESS, CURVED COMPOSITE MEMBER

REFERENCE TO RELATED APPLICATIONS

This is a continuation of U.S. patent application Ser. No. 08/237,660 filed on May 4, 1994, now abandoned and a continuation-in-part of U.S. patent Application Ser. No. 07/913,594 filed on Jul. 14, 1992, now U.S. Pat. No. 5,437,899 and of U.S. patent application Ser. No. 08/178,664 filed on Jan. 7, 1994, pending, and of U.S. patent application Ser. No. 08/191,856, filed on Feb. 3, 1994, pending, which is a continuation-in-part of U.S. patent application Ser. No. 08/178,664, pending, each of which is expressly incorporated herein by reference.

FIELD OF THE INVENTION

The invention relates generally to a non-linear composite structural member which has a plurality of plies and a matrix material. The invention particularly relates to the structure and method of manufacture of a curved tubular composite wishbone boom which is suitable for use in sailing and wind surfing applications and which has high strength and light weight.

BACKGROUND OF THE INVENTION

Wishbone-shaped booms are used in many applications of sailing and wind surfing. Traditionally the booms are made from curved wood or tubular aluminum elements which are bent and then joined with fittings at both the leading and trailing edges of the sail mast.

Such traditional curved booms, however, have several problems. For example, aluminum is subject to corrosion and fatigue failures, and it is further weakened by the joining of the tubes at the most heavily-loaded leading edge, where the boom attaches via the fittings to the sail mast.

Improved designs over the wood and aluminum booms utilize curved composite tubes, made from glass and carbon fiber with reinforced thermoset resins, which are fastened to an aluminum or plastic fitting at the boom front. Although this design is an improvement over a boom made with aluminum tubing, booms made from curved composite tubes are still particularly subject to failure at the heavily-loaded front end where there is a joint between the front end fitting and the composite tubes.

Thus, further improvements are desired in the performance and construction of wishbone-shaped booms, and in curved composite members generally. Accordingly, an object of this invention is to provide a composite tubular member of high stiffness which can be formed into a continuous selectively-shaped tube thereby eliminating the joints necessary affix the mast to the boom.

A further object of this invention is to provide a composite tubular member which has variable bending stiffness along it's length to maximize the overall resistance of the wishbone boom to bending loads which result from wind forces on the sail.

Yet another object of the invention is to provide a composite structural member which may be formed into a predetermined shape, e.g., a sailboard boom, via a secondary processing of heating and bending.

These and other objects of the invention will become apparent in the description which follows.

SUMMARY OF THE INVENTION

As used herein, "composite member" includes curved articles of manufacture such as a "wind surfing boom" and a "helical spring". Likewise, "fiber component" includes the terms "fiber", "preform" and "yarn", and is used to describe any fiber-like material which can be interwoven, matted, stitched, wound and/or spooled in a selected or a random orientation. Additionally, "ply" includes the terms "laminate", "layer" and "sub-ply", and sometimes denotes a layered composition with layers, sub-plies, a plurality of fiber components, or a thermoplastic sheath or core.

In one aspect, the invention provides a composite member which has a selected curvature along an axis of elongation. The member has at least one interior ply with a first fiber component and a polymer matrix material. This first fiber component is helically-oriented relative to the axis and is generally selected from materials such as glass, carbon, aramid, and mixtures thereof.

The composite member of this aspect also includes at least one intermediate ply with a clockwise helically oriented fiber component, a counter-clockwise helically oriented fiber component, and a polymer matrix material. The clockwise helically oriented fiber component has a first angle of orientation relative to the axis which is substantially between zero and forty-five degrees, and the counter-clockwise helically oriented fiber component has a second angle of orientation which is equal and opposite to the first angle. Preferably, the clockwise and counter-clockwise helically oriented fiber components are selected from materials such as carbon, aramid, glass, and mixtures thereof.

This aspect of the invention also includes at least one exterior ply which has a second fiber component and a polymer matrix material. This second fiber component is helically-oriented relative to the axis and is generally selected from materials such as glass, carbon, and aramid, and mixtures.

In a preferred aspect according to the invention, the first angle, and hence the second angle, has selected different values along the length of the composite member. These selected different values of the first angle are a function of the curvature of the composite member and are greater at axial locations of increased curvature and less at axial locations of decreased curvature.

One primary reason for varying the first angle between zero and forty-five degrees is to facilitate bending of the composite member. Helically oriented fiber components are wrapped around the member's circumference, as opposed to axially oriented or "zero degree" fiber components; and thus these helically oriented fiber components tend to function like a coiled-spring and cancel out the tension and compressive strains imposed on the fiber components as a result of bending. If, on the other hand, the fiber components were not helically oriented, the compressed fiber components on the inside of the bend would tend to buckle, and the fiber components on the outside of the radius of the bend would tend to slide because of tension. Therefore, the selected different values of the first angle are chosen so that when a previously straight composite tube is bent, the compressed fiber components on the inside of the bend do not tend to buckle, and the fiber components on the outside of the radius of the bend do not tend to slide.

It is nevertheless difficult to achieve this. Theoretically, it would take very shallow helical angle to balance out the tensile and compressive strains caused by bending on the fiber. However, the friction of the resin and the compaction tape which is applied to the outside of the structure during manufacture prevents these tensile and compressive strains from canceling out completely. Accordingly, a larger first angle is required to overcome the friction with increased curvature; and a smaller first angle is required with decreased curvature. An angle greater than forty-five degrees is generally not practical because of the resulting loss in bending stiffness of the finished composite member. Thus, the preferred range of values according to the invention is from between zero and forty-five degrees and is functionally dependent upon the curvature of the composite member: the first and second angles of the helically oriented fiber components are approximately zero at axial locations along the composite member which are straight; and the first and second angles have a helical orientation of up to forty-five degrees at axial locations along the composite member which have increased radial curvature.

In accord with another aspect of the invention, at least one of the first and second fiber components has a helical angle substantially between seventy-five and ninety degrees relative to the axis. Preferably, both the interior and exterior plies are helically wound about the axis at this high angular orientation.

In accord with another aspect of the invention, the composite member has a bending stiffness which is substantially along the axis and the intermediate ply is arranged to provide at least 80% of the bending stiffness. Thus, the intermediate ply provides the primary load-carrying capability of the composite member.

A composite member according to the invention can also have a variable bending stiffness along the axis. This bending stiffness is selectable by selecting the first angle substantially between zero and forty-five degrees at axial locations along the composite member to select the bending stiffness at those axial locations.

In a preferred aspect, the invention also provides at least one pair of interlace fibers that are interlaced with at least one of the helically oriented fiber components of the aforementioned three-ply composite member. This pair includes (i) a first interlace fiber component oriented at an angle substantially between ten and sixty degrees relative to the angle of the one helically oriented fiber component, and (ii) a second interlace fiber component oriented relative to the angle of the one helically oriented fiber component with an angle that is equal and opposite to the first interlace fiber component. These interlace fiber components function to bind the primary helically oriented fiber components together, and are thus made from materials such as glass, carbon, aramid, polyethylene, polyester, and mixtures thereof.

Accordingly, and in another aspect, the intermediate ply can include a first interlace fiber component, a second interlace fiber component, a third interlace fiber component, and a fourth interlace fiber component, each of which is made from aramid, glass, linear polyethylene, polyethylene, polyester, carbon, or mixtures thereof. The interlace fibers are interwoven with the helically oriented fibers as follows: the first interlace fiber component is interwoven with the clockwise helically oriented fiber component at a first interlace angle substantially between ten and sixty degrees relative to the first angle; the second interlace fiber component is interwoven with the clockwise helically oriented fiber component at a second interlace angle relative to the first angle that is equal and opposite in sign to the first interlace angle; the third interlace fiber component is interwoven with the counter-clockwise helically oriented fiber component with a third interlace angle between substantially ten and sixty degrees relative to the second angle; and the fourth interlace fiber component is interwoven with the counter-clockwise helically oriented fiber component with a fourth interlace angle relative to the second angle that is equal and opposite in sign to the third interlace angle.

A composite member thus manufactured can have a variable bending stiffness along the axis by making the first angle variable along the axis and adjusting the first angle, and hence the second angle, to attain a selected minimum value of the bending stiffness at selected different locations along the composite member.

A suitable polymer matrix material according to the invention includes B-staged thermoset, nylon-6 thermoplastic, polyether-ether-ketone, polyphenylene sulfide, polyethylene, polypropylene, thermoplastic urethanes, epoxy, vinylester, and polyester. B-staged thermoset is advantageous because of its relatively low melting temperature, which allows a secondary process of heating and bending of the composite member, as discussed in greater detail below.

In another aspect, the invention provides at least one stitching fiber that is interwoven with itself and with at least one of the fiber components within the composite member. Such a stitching fiber is made from polyester, glass, carbon, aramid, and mixtures thereof, and is particularly well-suited for binding together one of the fiber components from the intermediate ply, adding stability to the pre-cured composite member and adding strength to the post-cured composite member. Similarly, the composite member according to the invention can include, in the intermediate ply, a first clockwise helically oriented braiding yarn component and a second counter-clockwise oriented braiding yarn component which are interwoven with at least one of the fiber components of the intermediate ply.

Preferably, the clockwise helically oriented fiber component of the intermediate ply is interwoven with the counter-clockwise helically oriented fiber component of the intermediate ply.

A composite member according to the invention can also include a fiber component which includes a plurality of interwoven fibers.

To facilitate a secondary process of forming the composite member into a shape with selected axial curvature, by heating and bending, the invention provides, in another aspect, a composite member which includes (i) an outer sheath of thermoplastic that is disposed exterior to the exterior ply, and (ii) an inner core of thermoplastic disposed interior to the interior ply. The thermoplastic outer sheath and inner core have higher melting temperatures than the matrix material within the plies so that the composite member is capable of reformation at selected locations along the axis by heating and bending the composite member at the selected locations. This inner core of thermoplastic may be solid; but it may also be tubular to provide a conduit within the composite member for transferring fluids such as air through the composite member. Accordingly, when the core is tubular and when the composite member is reformed into a shape with selected curvature, the composite member can function as pneumatic tubing with high strength and high stiffness.

In another aspect, the invention provides a composite member with selected curvature along an axis of elongation. Such a member includes at least one interior ply with a first fiber component and a polymer matrix material. The first fiber component is helically-oriented relative to the axis.

Such a member also includes a first intermediate ply with a first axially extending fiber component, first and second interlace fiber components interlaced with the first axially extending fiber component, and a polymer matrix material. The first axially extending fiber component has a first angle of orientation relative to the axis of substantially between zero and forty-five degrees. The first interlace fiber component is oriented at an angle substantially between ten and sixty degrees relative to the first angle of orientation. The second interlace fiber component is oriented relative to the first angle of orientation at an angle that is equal and opposite to the angle of the first interlace fiber component.

Such a member further includes a second intermediate ply with a second axially extending fiber component, third and fourth interlace fiber components interlaced with the second axially extending fiber component, and a polymer matrix material. The second axially extending fiber component has a second angle of orientation relative to the axis that is equal and opposite to the first angle of orientation. The third interlace fiber component is oriented at an angle substantially between ten and sixty degrees relative to the second angle of orientation. The fourth interlace fiber component is oriented relative to the second angle of orientation at an angle that is equal and opposite to the third interlace fiber component.

Finally, such a member includes at least one exterior ply with a second fiber component and the matrix material. Like the first fiber component, the second fiber component is also helically-oriented relative to the axis.

The preferred materials for manufacturing the above plies is as follows: the first and second fiber components can be selected from glass, carbon, aramid, and mixtures thereof; the first and second axially extending fiber components can be selected from made from carbon, aramid, glass, and mixtures thereof; and the first, second, third, and fourth interlace fibers can be selected from glass, carbon, aramid, polyethylene, polyester, and mixtures thereof.

In a preferred aspect according to the invention, the composite member has a variable first angle of orientation that has selected different values along the length of the member. These values of the first angle of orientation are a function of the curvature such that the first angle is greater at axial locations of increased curvature and less at axial locations of decreased curvature.

In yet another aspect, the invention provides a tubular composite member which has an initial axial shape that can be formed into a selected axially-curved shape. A thermoplastic inner core is the interior most component, or "ply", of this tubular member.

The tubular member includes at least one intermediate ply, disposed exterior to the thermoplastic inner core, which has a clockwise helically oriented fiber component, a counter-clockwise helically oriented fiber component, and a polymer matrix material. The clockwise helically oriented fiber component has a first angle of orientation substantially between zero and forty-five degrees relative to the axis of the tubular composite member. The counter-clockwise helically oriented fiber component has a second angle of orientation relative to the axis which is equal and opposite to the first angle. The clockwise and counter-clockwise helically oriented fiber components are preferably made from carbon, aramid, glass, and mixtures thereof.

The tubular member further includes an exterior sheath of thermoplastic disposed exterior to the intermediate ply. The thermoplastic inner core, which may be solid or tubular, and the exterior sheath have a melting temperature which is higher than the matrix material of the intermediate ply so that the inner core, exterior sheath and the intermediate ply may be reformed from the initial axial shape into the selected axially-curved shape by bending the composite member when heated.

Preferably, the first angle of the tubular member has selected different values along the length of the member. These values are a function of the selected axially-curved shape of the composite member such that the first angle is greater at axial locations of increased curvature and less at axial locations of decreased curvature.

The intermediate ply of the tubular member can further include a first interlace fiber component, a second interlace fiber component, a third interlace fiber component, and a fourth interlace fiber component, each of which is selected from materials such as aramid, glass, linear polyethylene, polyethylene, polyester, carbon, and mixtures thereof. The first interlace fiber component is interwoven with the clockwise helically oriented fiber component with a first interlace angle of ten to sixty degrees relative to the first angle. The second interlace fiber component is interwoven with the clockwise helically oriented fiber component with a second interlace angle relative to the first angle that is equal but opposite in sign to the first interlace angle. The third interlace fiber component is interwoven with the counter-clockwise helically oriented fiber component with a third interlace angle of ten to sixty degrees relative to the second angle. And the fourth interlace fiber component is interwoven with the counter-clockwise helically oriented fiber component with a fourth interlace angle relative to the second angle that is equal but opposite in sign to the third interlace angle.

In another aspect, the tubular member includes at least one pair of interlace fibers interlaced with at least one of the helically oriented fiber components. The pair thus includes (i) a first interlace fiber component oriented at an angle of between ten to sixty degrees relative to the angle of the one helically oriented fiber component, and (ii) a second interlace fiber component oriented relative to the angle of the one helically oriented fiber component with an angle that is equal but opposite in sign to the first interlace fiber component.

In still another aspect of the invention, there is provided a tubular composite member that has an initial axial shape and that may be formed into a selected axially-curved shape. The tubular member includes a thermoplastic inner core which may be solid or tubular.

The tubular member further includes a first intermediate ply with a first axially extending fiber component, first and second interlace fiber components interlaced with the first axially extending fiber component, and a polymer matrix material. The first axially extending fiber component has a first angle of orientation substantially between zero and forty-five degrees relative to the axis of the composite member. The first interlace fiber component is oriented at an angle substantially between ten and sixty degrees relative to the first angle of orientation. The second interlace fiber component is oriented relative to the first angle of orientation at an angle that is equal and opposite to the first interlace fiber component.

The tubular member further includes a second intermediate ply with a second axially extending fiber component, third and fourth interlace fiber components interlaced with the second axially extending fiber component, and a polymer matrix material. The second axially extending fiber component has a second angle of orientation relative to the axis that is equal and opposite to the first angle of orientation. The third interlace fiber component is oriented at an angle substantially between ten and sixty degrees relative to the second angle of orientation. The fourth interlace fiber component is oriented relative to the second angle of orientation at an angle that is equal and opposite to the third interlace fiber component.

The tubular member further includes an exterior sheath of thermoplastic disposed exterior to the intermediate ply.

In combination, the thermoplastic inner core and the exterior sheath have a melting temperature which is higher than the matrix material so that the inner core, exterior sheath and the intermediate ply are formable from the initial axial shape into the selected axially-curved shape by heating and then bending the composite member.

There are many materials which can form the several layers of this tubular member. For example, the first and second axially extending fiber components can be made from materials such as carbon, aramid, glass, and mixtures thereof. The first, second, third, and fourth interlace fibers can be made from materials such as glass, carbon, aramid, polyethylene, polyester, and mixtures thereof.

The invention also provides, in another aspect, a method of manufacturing a composite member which has a selected curvature along an axis of elongation and which has a plurality of radially contiguous plies, including the steps of: (i) forming at least one interior ply exterior to an elongate flexible mandrel by helically orienting a first fiber component about the elongate mandrel and wetting the first fiber component with a liquid matrix material; (ii) forming a first intermediate ply exterior to the interior ply by applying onto the interior ply a clockwise helically oriented fiber component and a counter-clockwise helically oriented fiber component with the matrix material, including the step of helically orienting the clockwise helically oriented fiber component at a first angle selected from substantially between zero and forty-five degrees relative to the axis, including the further step of helically orienting the counter-clockwise helically oriented fiber component at a second angle of orientation relative to the axis which is equal and opposite to the first angle, (iii) forming at least one exterior ply onto the intermediate ply by helically orienting a second fiber component about the intermediate ply and wetting the second fiber component with the matrix material, (iv) bending the composite member into a the selected curvature, and (v) curing the composite member and removing the mandrel.

The method can additionally include the step of orienting the helically oriented fiber components with selected different values along the axial length of the composite member as a function of the subsequently formed curvature of the composite member such that the first angle is greater at axial locations of increased curvature and less at axial locations of decreased curvature.

Further, the method can include the step of orienting the first and second fiber components at a helical angle selected from between 75–90 degrees relative to the axis.

In another aspect, the method can include the additional step of providing the intermediate ply with at least 80% of the bending stiffness of the selectively curved composite member by selecting (i) the tensile modulus at least one of the fiber components and (ii) by selecting the angles of orientation. More particularly, the bending stiffness is increased by selecting one or more fiber components with a higher tensile modulus, or by decreasing the angle of orientation of the helically oriented fiber component in the intermediate ply.

In another aspect, the method includes the step of varying the first angle selectively along the axis to attain a selected minimal bending stiffness of the composite member at different locations along the axis.

In another aspect according to the invention, a method is provided for manufacturing a composite member with selected curvature along an axis of elongation and with a plurality of radially contiguous plies, including the generally successive steps of: (A) forming at least one interior ply exterior to an elongate flexible mandrel by helically orienting a first fiber component about the elongate mandrel and wetting the first fiber component with a liquid matrix material; (B) forming a first intermediate ply exterior to the interior ply by applying onto the interior ply a first axially extending fiber component, and first and second interlace fiber components with the matrix material, including the steps of (i) interlacing the first axially extending fiber with the first and second interlace fiber components, (ii) helically orienting the first axially extending fiber component at a first angle selected from substantially between zero and forty-five degrees relative to the axis, (iii) helically orienting the first interlace fiber component at an angle from substantially between ten and sixty degrees relative to the first angle, and (iv) helically orienting the second interlace fiber component relative to the first angle at an angle that is equal and opposite to the angle of the first interlace fiber component; (C) forming a second intermediate ply exterior to the first intermediate ply by applying onto the first intermediate ply a second axially extending fiber component, and third and fourth interlace fiber components with the matrix material, including the steps of (i) interlacing the second axially extending fiber with the third and fourth interlace fiber components, (ii) helically orienting the second axially extending fiber component at a second angle selected from substantially between zero and forty-five degrees relative to the axis, (iii) helically orienting the third interlace fiber component at an angle from substantially between ten and sixty degrees relative to the second angle, and (iv) helically orienting the fourth interlace fiber component relative to the second angle at an angle that is equal and opposite to the angle of the third interlace fiber component; (D) forming at least one exterior ply onto the intermediate ply by helically orienting a second fiber component about the second intermediate ply and wetting the second fiber component with the matrix material; (E) bending the composite member into the selected curvature, and (F) curing the composite member and removing the mandrel.

This method preferably includes the step of orienting the helically oriented fiber components with selected different values along the axial length of the composite member as a function of the subsequently formed curvature of the composite member such that the first angle is greater at axial locations of increased curvature and less at axial locations of decreased curvature.

In still another aspect according to the invention, a method is provided for manufacturing a composite member with selected curvature along an axis of elongation, including the steps of: (A) forming at least one intermediate ply exterior to an elongate core of thermoplastic by applying onto the core a clockwise helically oriented fiber component and a counter-clockwise helically oriented fiber component with a liquid matrix material, and such that the matrix material has a lower melting temperature than the thermoplastic core, including the step of helically orienting the clockwise helically oriented fiber component at a first angle selected from substantially between zero and forty-five degrees relative to the axis, including the further step of helically orienting the counter-clockwise helically oriented fiber component at a second angle of orientation relative to the axis which is equal and opposite to the first angle; (B) polymerizing the intermediate ply; (C) forming an outer sheath of thermoplastic onto the intermediate ply after the step of polymerizing the intermediate ply, and such that the outer sheath has a higher melting temperature than the matrix material; (D) heating the core, intermediate ply, outer sheath and matrix material to approximately 450 degrees F.; and (E) bending the composite member, when so heated, into a shape having the selected curvature.

In still another aspect, a method is provided for manufacturing a composite member with selected curvature along an axis of elongation, including the steps of: (A) forming a first intermediate ply with a liquid matrix material exterior to an elongate core of thermoplastic by applying onto the core a first axially extending fiber component interlaced with first and second interlace fiber components, such that the matrix material has a lower melting temperature than the thermoplastic core, including the step of helically orienting the first axially extending fiber component at a first angle selected from substantially between zero and forty-five degrees relative to the axis, including the further steps of helically orienting the first interlace fiber component at an angle from between ten and sixty degrees relative to the first angle and orienting the second interlace fiber component at an angle relative to the first angle that is equal and opposite to the angle of the first interlace fiber component; (B) forming a second intermediate ply with the liquid matrix material exterior to the first intermediate ply by applying onto the first intermediate ply a second axially extending fiber component interlaced with third and fourth interlace fiber components, including the step of helically orienting the second axially extending fiber component at a second angle relative to the axis that is equal and opposite to the first angle, including the further steps of helically orienting the third interlace fiber component at an angle from between ten and sixty degrees relative to the second angle and orienting the fourth interlace fiber component at an angle relative to the second angle that is equal and opposite to the angle of the third interlace fiber component; (C) polymerizing the intermediate plies; (D) forming an outer sheath of thermoplastic onto the second intermediate ply after the step of polymerizing the intermediate plies, and such that the outer sheath has a higher melting temperature than the matrix material; (E) heating the core, intermediate plies, outer sheath and matrix material to approximately 450 degrees F.; and (F) bending the composite member, when so heated, into a shape with the selected curvature.

In each of the afore-mentioned methods, the selected curvature of the composite member may be, for example, be selected with the shape of a helical coil spring, an automobile spring, a leaf spring, and a wind surfing sail board boom.

The method of the invention thus constructs a curved composite member that has several advantages. First, it has relatively high strength and high stiffness. Secondly, it provides a continuous member with no intermediate joints which can fail. Thus, for example, the invention is particularly useful in constructing a one-piece wind surfing boom. In addition, the curved composite member of the invention provides in certain aspects a high strength pneumatic tubing which can be formed into a desired and selected shape by a secondary process of heating and bending.

The invention is next described further in connection with preferred embodiments, and it will be apparent that various additions, subtractions, and modifications can be made by those skilled in the art without departing from the scope of the invention.

BRIEF DESCRIPTION OF THE DRAWINGS

A more complete understanding of the invention may be obtained by reference to the drawings, in which:

FIG. 2D is a side view of a ply, constructed according to the invention, that has tri-axially braided fiber components at an off-axis angle relative to a longitudinal axis and which is suitable for constructing the intermediate ply of the composite member shown in FIGS. 1-1A;

FIG. 2E is a cross-sectional view of a four-ply laminate, constructed according to the invention, that has two sub-plies forming an intermediate load-carrying ply and which is suitable for constructing the composite member shown in FIGS. 1-1A;

FIG. 2F is an enlargement of the wall section of the laminate depicted in FIG. 2E

FIG. 4 is a perspective view, partially broken away, of a three-ply composite member constructed according to the invention and which permits secondary formation of the member into a selected axially-curved shape;

FIG. 4A shows a cross-sectional view of the composite member shown in FIG. 4;

FIG. 5 is a cross-sectional view of a four-ply laminate, constructed according to the invention, that has two sub-plies forming an intermediate load-carrying ply and which is sandwiched between a thermoplastic inner core and outer sheath to facilitate a secondary processing;

FIG. 5A is an enlargement of the wall section of the laminate depicted in FIG. 5

DETAILED DESCRIPTION OF ILLUSTRATED EMBODIMENTS

A composite member according to the invention is generally a continuous, elongate shaft which has an axis with curvature and which can have a variety of tubular cross-sectional shapes, including circular, oval, rectangular, square, polygonal, and the like. It is particularly well suited for constructing a continuous and curved tubular wind surfing boom. It is also well-suited for constructing a helical spring, for replacing the iron spring in automobiles, and for constructing pneumatic tubing.

In one embodiment of the invention, the composite member is constructed with a plurality of plies, each having a fiber component disposed with a matrix material, e.g., a polymer resin. In one other embodiment of the invention, the composite member is constructed with one ply, having a fiber component disposed with a matrix material, that is sandwiched between thermoplastic material such that the member may be reformed into a predetermined shape by subsequent heating and bending. In each embodiment of the invention, the fiber and matrix materials, together with the fiber component orientations, are selected in combination to provide high stiffness and strength and a desired curvature in a single, continuous curved composite structure.

Figures 1, 1A:
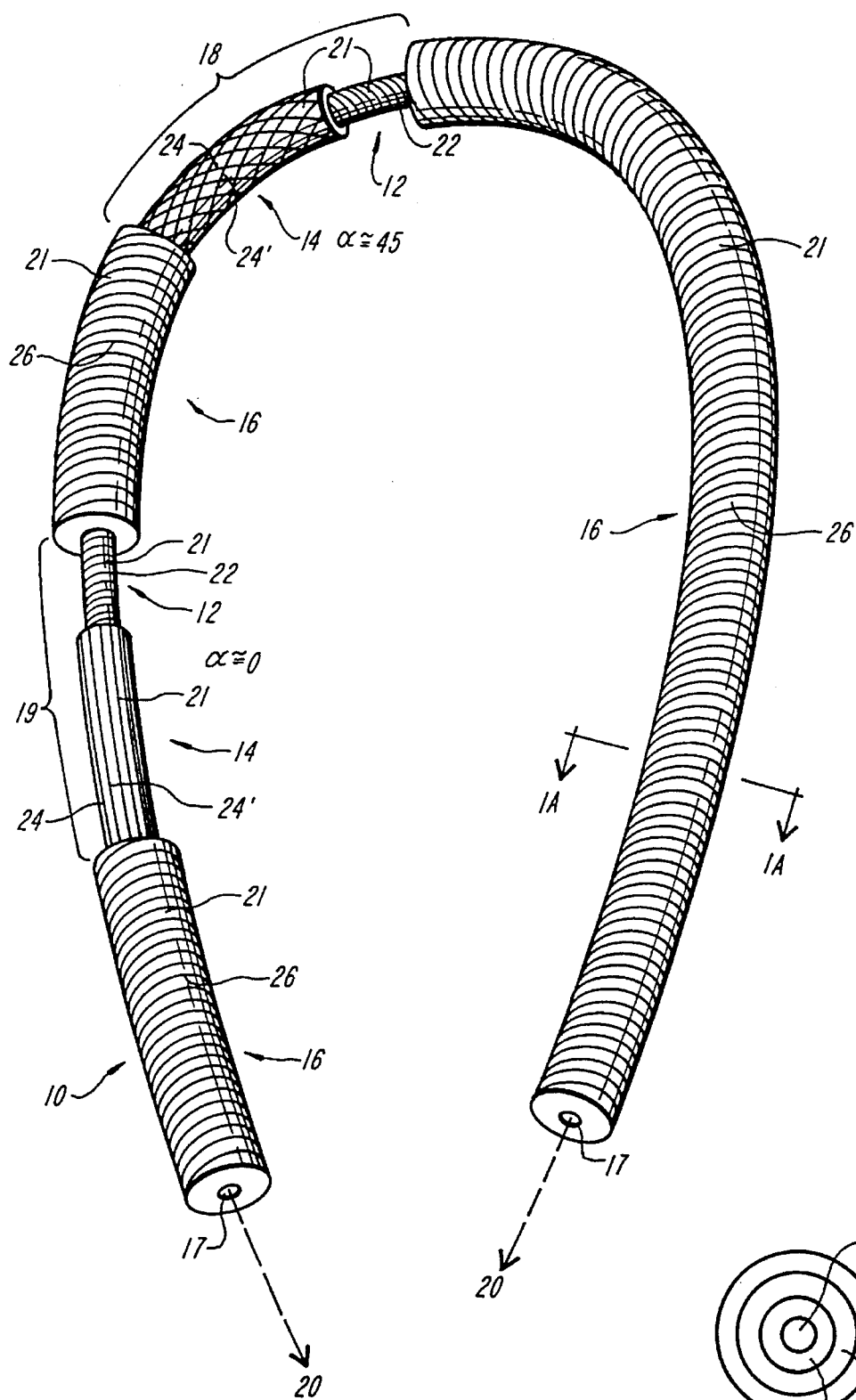
FIG. 1 is a top view, partially broken away, of a three-ply composite member constructed according to the invention and which is shaped into a wind surfing boom.
FIG. 1A shows a cross-sectional view of the composite member of FIG. 1.

FIGS. 1 and 1A show a hollow composite member 10 constructed in accordance with the invention which has an interior ply 12, an intermediate ply 14, and an exterior ply 16. The plies 12, 14 and 16 form a hollow center interior 17; and thus form a tubular composite member 10. FIG. 1 is broken away at portions 18 and 19 to illustrate the plies 12 and 14 which are interior to the exterior layer 16.

The illustrated member 10 (not to scale) normally has an axis of elongation 20 through the center 17 and resists bending from its normal profile with a selected stiffness along the axis 22. The illustrated interior ply 12 has a hollow, generally cylindrical shape. The intermediate ply 14 likewise has a generally cylindrical shape and covers the interior ply and is contiguous with it, and the outer ply 16 likewise contiguously covers the intermediate ply.

Each ply 12, 14 and 16 has one or more fiber components disposed or embedded with a polymer matrix material 21, e.g., a thermoplastic resin. The material and the orientation for the fiber component in each ply is selected to achieve the desired strength and operational characteristics for that ply. The interior ply 12 has a first fiber component 22 that is helically oriented relative to the axis 20. Preferably, the helically oriented fiber component 22 has an angle of approximately seventy-five to ninety degrees relative to the axis 20 at each axial location along the member 10.

The intermediate ply 14 has a clockwise helically-oriented fiber component 24 and a counter-clockwise helically-oriented fiber component 24'. The clockwise helically-oriented fiber component 24 has a first angle $\alpha$ of orientation relative to the axis 20 of approximately zero to forty five degrees. The counter-clockwise helically-oriented fiber component 24' has a second angle of orientation relative to the axis 20 which is equal and opposite to the first angle, i.e., $-\alpha$. Accordingly, the intermediate ply 14 with the fiber components 24, 24' is appropriately titled a "bi-axially braided ply".

Similar to the interior ply, the exterior ply 16 has a second fiber component 26 that is helically oriented relative to the axis 20. Preferably, the helically oriented fiber component 26 has an angle of approximately seventy-five to ninety degrees relative to the axis 20 at each axial location along the member 10.

The first and second angles of the intermediate ply 14 preferably vary along the length of the composite member 10 with selected different values as a function of the curvature of the composite member 10 such that the first and second angles are greater at axial locations of increased curvature, e.g., at portion 18, and are less at axial locations of decreased curvature, e.g., at portion 19. Accordingly, and as illustrated in FIG. 1, the first angle $\alpha$ at portion 19 is approximately zero, and the first angle $\alpha$ at portion 18 is greater, here shown as a maximum of forty-five degrees.

The selection of the angle $\alpha$ facilitates the bending of the composite member 10 during its manufacture. If the fiber components 24, 24' are not helically oriented at axial locations with curvature, those fiber components would tend to compress and buckle in the inner parts of the bend, and they would also tend to slip on the outer parts of the bend.

However, it should be noted that a single angular orientation for the fiber components 24, 24' along the length of the member 10 falls within the scope of the invention. For example, one embodiment of the invention includes a clockwise helically oriented fiber component which has a constant first angle $\alpha$ of fifteen degrees at each axial location along the axis 20. Moreover, the counter-clockwise helically oriented fiber component within the intermediate ply has a constant second angle $-\alpha$ of minus fifteen degrees along the axial length of the composite member 10. These constant first and second fiber angles facilitate the manufacturing process, as compared to the variably selected angles, and provide an acceptable fiber orientation to reduce the compression, buckling, and strain on the fiber components at the curved portions along the composite member 10. Other acceptable first and second angles fall between the stated range of zero to forty-five degrees.

The plies 12, 14 and 16 provide, respectively, a portion of the entire binding stiffness of the composite member 10. The intermediate ply 14, however, preferably provides at least 80% of the total bending stiffness. One way the intermediate ply 14 provides such overall stiffness is by selecting the appropriate fiber materials for the clockwise and counter-clockwise helically oriented fiber components. For example, glass, aramid, and carbon fibers each provide a high tensile modulus, as for instance compared to polyester, and thus these materials provide relatively high axial stiffness.

One other way to increase the bending stiffness of the composite member 10 is to orient the helically oriented fiber components 24, 24' within the intermediate ply 14 at appropriate and selected angles: the lower the angles of orientation, the greater the bending stiffness, and vice versa. This relationship is approximately illustrated as a cosine-to-the-fourth function at every axial location along the member 10. That is, the bending stiffness decreases at approximately a cosine-to-the-fourth fall-off as a function of off-axis angle at axial locations along the member. For example, a zero degree angle for the intermediate fiber components at one axial location means that approximately 100% of the intermediate ply's bending stiffness is achieved at that location, since the cosine of zero is one. However, the cosine of forty-five degrees is 70%, and if the fiber components are oriented at forty-five degrees, the cosine-to-the-fourth fall off means that only 25% of the intermediate ply's bending stiffness is achieved at that axial location. It is not very practical to have an intermediate ply 14 with less than 25% of the possible bending stiffness in that layer; and hence the fiber orientations of the intermediate ply 14 are generally no more than forty-five degrees relative to the axis 20 and at each axial location along the member 10.

The fiber component 22 of the interior ply 12 is preferably an aramid, e.g., Kevlar by Dupont; glass; carbon; linear polyethylene, e.g., Allied Spectra fiber; polyethylene; polyester; or mixtures thereof. The second fiber component 24, 24' of the intermediate ply 14 is preferably made from carbon, glass, aramid, or mixtures thereof. And the second fiber component 26 of the exterior ply 16 is preferably each made from glass, carbon, aramid, polyester, or mixtures thereof.

The preferred matrix material 21 according to the invention is a high elongation, high strength, impact resistant thermoplastic material such as Nylon-6 or B-staged thermoset. Alternatively, a thermosetting material such as epoxy, vinyl ester, or polyester is used. The matrix material is distributed substantially uniformly among the fiber components 22, 24, 24' and 26 of FIG. 1. In one application, the matrix material is generously applied in viscous form to the fiber components during manufacture such that upon hardening or polymerization, e.g., through a bake or heating cycle, the matrix material hardens to stabilize the fiber components. The hardened matrix and fiber components form the solid composite member 10.

More particularly, a preferred method for distributing a Nylon-6 matrix material with the fiber components 22, 24, 24', 26 of FIG. 1, for example, is to impregnate the "dry" fiber components, i.e., the fiber preform comprising unwetted, interwoven, or braided fibers, with a low viscosity nylon monomer, e.g., $\epsilon$-caprolactam, blended with a suitable catalyst, e.g., sodium, and a promoter. Polymerization of the catalyzed and promoted $\epsilon$-caprolactam occurs shortly after impregnation, yielding a high molecular weight Nylon-6 matrix material. The resulting composite member 10 is extremely durable because of the high elongation to failure of the matrix as well as its abrasion resistance and ability to prevent crack propagation.

Alternatively, the matrix material is supplied in a dry, fiber or powdered form which is "co-mingled" with the fiber components 22, 24, 24', and 26. By applying heat and pressure to the co-mingled fiber components and dry matrix material, the matrix melts and impregnates the fiber preform components 22, 24, 24', and 26 to yield the final composite member 10.

While Nylon-6 is deemed a preferred matrix material for use with the invention, thermosetting resins in the epoxy, vinyl-ester or polyester groups represent alternative matrix materials suitable for the above-described high strength shaft-like composite members. For example, Polyether-Ether-Ketone (Peek), Polyphenylene Sulfide (PPS), Polyethylene, Polypropylene and Thermoplastic Urethanes (TPU's) all provide a level of damage tolerance for the composite member 10 that is similar to Nylon-6.

It is to be understood that any of the plies 12, 14, and 16 can be constructed of a plurality of plies which combine to create the above-described characteristics. For example, and as described in more detail below, a stitching fiber may be interwoven with any of the fiber components 22, 24, 24', and 26 to provide additional strength and binding of the member 10. Additionally, any of the fiber components 22, 24, 24', and 26 can include a plurality of fibers to operate in substantially the same way.

However, it is the intermediate ply which can generally include the most variations within its ply and fiber construction and geometry. For example, a plurality of layers or plies can operate in combination to form the ply 14 shown in FIGS. 1 and 1A as a compound ply. Illustrative details concerning additions or alternate orientations and geometries of the fiber components within the intermediate ply 14 are described below, particularly in connection with FIGS. 2A–2B.

Each of FIGS. 2A–2D illustrate a "flattened out" view of a ply 40 in accordance with the invention and is suitable for constructing a ply 14 of a composite member 10. Each drawing thus shows a planar projection of a ply 40 that has a generally cylindrical shape. The ply 40 provides a bending stiffness 43 that is substantially along an axis 41 of that cylindrical shape. Each ply 40 has at least one fiber component 42 that is representative, for example, of the fiber components 24 and 24' described above.

Figure 2A:
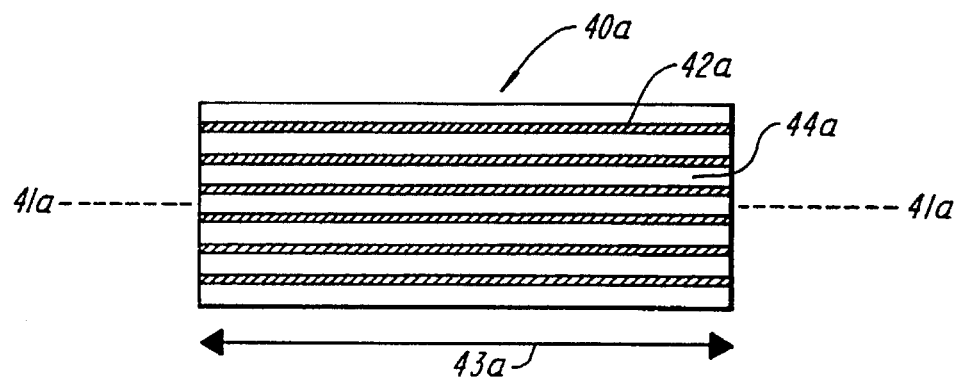
FIG. 2A is a side view of a ply, constructed according to the invention, that has unidirectional fiber components and which is suitable for constructing the intermediate ply of the composite member shown in FIGS. 1-1A.

FIG. 2A shows a ply 40a that has a fiber component 42a arranged axially and unidirectionally along the elongate axis 41a, such as similarly shown in the intermediate ply 14, portion 19, of FIG. 1. The matrix material 44a is disposed with the fiber component 42a in a combination that can be cured to form a solid ply, as above. The axial fiber geometry of FIG. 2A provides high bending strength 43a as discussed previously with respect to the cosine-to-the-fourth fall-off. Nevertheless, the ply 14 of FIG. 1 can be formed in part with a unidirectional fiber component such as shown in FIG. 2A and can further vary the fiber material and fiber volume to adjust the ply's strength.

Figure 2B:
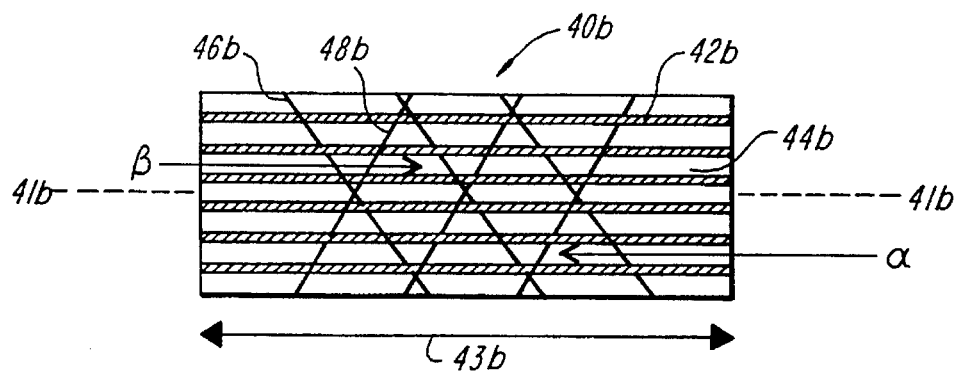
FIG. 2B is a side view of a ply constructed according to the invention which has tri-axially braided fiber components and which is suitable for constructing the intermediate ply of the composite member shown in FIGS. 1-1A.

FIG. 2B shows a ply 40b wherein the fiber component 42b is axially extending and interwoven, i.e., helically braided, with a plurality of like or different fiber components, here shown as first interlace fiber component 46b and second interlace fiber component 48b. The interlace fiber components 46b and 48b are also preferably interwoven amongst themselves. To this end, successive crossings of two fiber components 46b and 48b have successive "over" and "under" geometries. In this configuration, the ply fiber geometry of the ply 40b of FIG. 2B, appropriately denoted as a "tri-axially" braided ply, is stronger than the axial geometry of FIG. 2A. The helically oriented interlace fiber components 46b and 48b tend to tightly bind the axially extending fiber component 42b with the matrix material 44b, in addition to providing increased bending stiffness 43b.

In one embodiment of the invention, the intermediate ply 14 of FIGS. 1 and 1B includes at least one sub-ply with a tri-axial braided fiber geometry such as shown in FIG. 2B. In such a ply 14, the axially extending fiber 42c is similar to the helically oriented fiber components 24, 24' of FIG. 1 oriented at first and second angles of approximately zero degrees, such as shown in ply 14, portion 19.

Binding the fiber components together within a given ply, such as within intermediate ply 14 of FIG. 1, is a preferred practice of the invention. Each interlace fiber can therefore be considered as a stitching fiber. In certain aspects of the invention, a single stitching fiber, such as the fiber 46b of FIG. 2B, binds the fiber component of a given ply together by interweaving the stitching fiber with itself and with the fiber component 42. A fiber is interwoven with itself, for example, by successively wrapping the fiber about the member and looping the fiber with itself at each wrap.

The fibers 46b and 48b of FIG. 2B may be of different materials, although it generally is preferred that they be the same material. The group of fiber materials suitable to form the interlace fiber components 46b and 48b include carbon, glass, polyester, aramid, and mixtures thereof.

The angles of orientation for the fibers 46b and 48b, denoted as $\beta$ and $\alpha$ respectively, relative to the longitudinal axis 41b, are also preferably equal, although they are not required to be. They are oriented relative to the fiber orientation of the axially extending fiber component 42b and at an angle between approximately ten and sixty degrees. Because the bending stiffness 43b changes when the angles $\beta$ and $\alpha$ change, it is a feature of the invention that one of more of the angles β and α are adjusted to modify or change the bending stiffness 43b of the composite member to the desired magnitude, or to a selected minimum value. The variable angles β and α are introduced during the manufacturing process.

Thus, for example, if the composite member 10 of FIG. 1A is to have increased bending stiffness at a selected axial location along the axis 20, a ply 40b from FIG. 2B may be used instead of ply 14, FIG. 1. Such a ply can have the variably selected angles β and α decrease towards their minimum of ten degrees in the corresponding portion of length along axis 41b. On the other hand, to decrease the bending stiffness of the composite member 10 at another selected portion of its length, the variably selected angles β and α are increased towards their maximum of sixty degrees in the portion of length along axis 41b corresponding to that portion of the member 10.

Figure 2C:
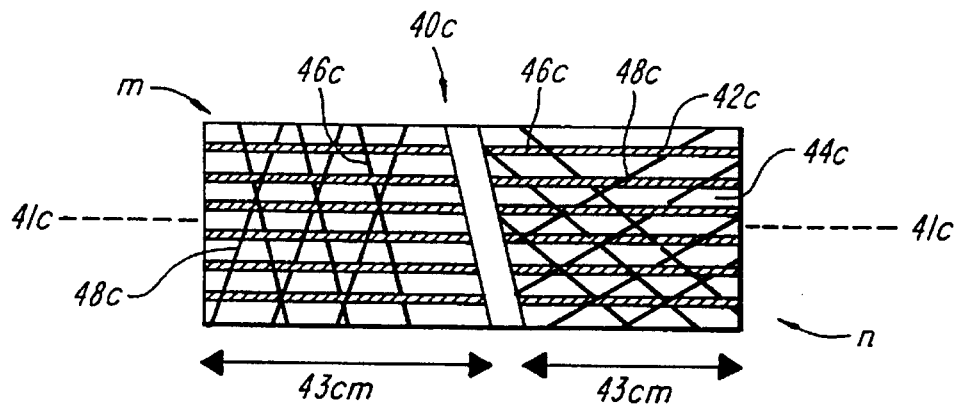
FIG. 2C is a side view of a variably stiff ply, constructed according to the invention, that has tri-axially braided fiber components at differing angles relative to a longitudinal axis and which is suitable for constructing the intermediate ply of the composite member shown in FIGS. 1-1A.

A composite member in accordance with the invention thus has a further feature relating to selectively variable angle geometry, as shown with the ply 40c of FIG. 2C. In FIG. 2C, the helically oriented fiber components 46c and 48c of the ply have at least two separate and distinct angles relative to the axis 41 c, at different axial locations within the ply 40c such that a single composite member has differing bending stiffness along its axial length. More particularly, and with reference to FIG. 2C, the ply 40c has two distinct sections m and n which denote regions of different fiber angles. In section m, the interlace fiber components 46c and 48c have a greater angle relative to the longitudinal axis 20, and thus provide lesser bending stiffness 43 cm than provided in section n. Similarly, in section n, the interlace fiber components 46c and 48c have a lesser angle relative to the longitudinal axis 41c, and thus provide greater bending stiffness 43 cm than provided in section m.

It should be noted that the fiber components 42c, 46c and 48c preferably run continuously through the ply 40 of FIG. 2C. Therefore, the angles at which the helically oriented fibers are interwoven with the axially extending fiber component 42c are most easily changed in a real-time fashion during the manufacturing process.

A composite member constructed in accordance with the invention also includes a ply 40 that contains only helically oriented fiber components. For example, if the unidirectional fiber component 42c from FIG. 2C is removed, there remains a ply 40c having only the helically oriented fiber components 46c and 48c. Such a ply 40c is for example shown in ply 14, portion 18, of FIG. 1, and is appropriately denoted "bi-axial", like before. Such a ply 40c can also have one or more selectively variable angles to adjust the bending stiffness along the length of the composite member. A "bi-axial ply" can additionally include fiber components which are braided together or two sub-plys which are helically braided or filament wound.

In a preferred embodiment according to the invention, ply 14 of FIG. 1 is formed with two sub-plies, each with a tri-axially braided structure such as illustrated in FIG. 2D. Unlike the fiber component 42 of FIGS. 2A–2C, the fiber component 42d of FIG. 2D is helically oriented relative to the longitudinal axis 41d at an angle γ, typically between zero and forty-five degrees, and the interlace fiber components 46d and 48d are helically oriented at an angle between ten and sixty degrees relative to the angle γ. The fiber component 42d preferably is selected from those fiber materials which provide significant stiffness strength with an increased tensile modulus, e.g., carbon, aramid, and glass, while the fibers 46d and 48d are more appropriately selected from flexible yarn components which have a decreased tensile modulus.

As earlier mentioned, it is preferred that the intermediate ply 14 of FIGS. 1–1A is formed with two sub-plies, each with a tri-axial braided ply such as shown in FIGS. 2D. However, it is most preferred that these two tri-axially braided plies, which are radially contiguous with one another, have varying angles γ relative to the axis 20 and as a function of the curvature of the composite member. That is, the helcially oriented fiber component 42d of one tri-axially braided ply is selected with a first angle between zero and forty-five degrees relative to the axis 41d; while the helically oriented fiber component 42d of the second tri-axially braided ply is oriented at a second angle that is equal and opposite to the first angle. The first and second angles are selected according to the curvature of the member. For example, the angles are substantially zero for straight portions of the member; and the angles are greater for curved regions of the member. In each ply, the interlace fiber components, e.g., the fibers 46d and 48d of FIG. 2D, are oriented with angles between ten and sixty degrees relative to the first and second angles, e.g., the angle γ.

FIG. 2E shows a cross-sectional views of a composite structure 49 constructed according to the invention and employing many of the ply geometries previously described. Such a composite structure is preferably manufactured with a flexible mandrel, which may be removed after forming the plies, and with a matrix material which can be cured while the boom is in a selectively curved geometry. Composite structure 49 has an interior ply 49a, a composite intermediate ply 49b, and an exterior ply 49c. The intermediate ply 49b is constructed with a plurality of plies, 49b1 and 49b2, that are preferably helically braided, such as illustrated in FIGS. 2B–2D, or bi-axially braided, such as shown within intermediate ply 14, portion 18, of FIG. 1. The interior ply 49a and exterior ply 49c are helically wound with a circumferentially extending fiber that subtends an angle of between approximately seventy-five and ninety degrees relative to the axis of the composite member, e.g., axis 20 of FIG. 1. Representative dimensions include an inner tubular interior of 2.67 cm, and an outer diameter of 3.1 cm.

Figure 3:
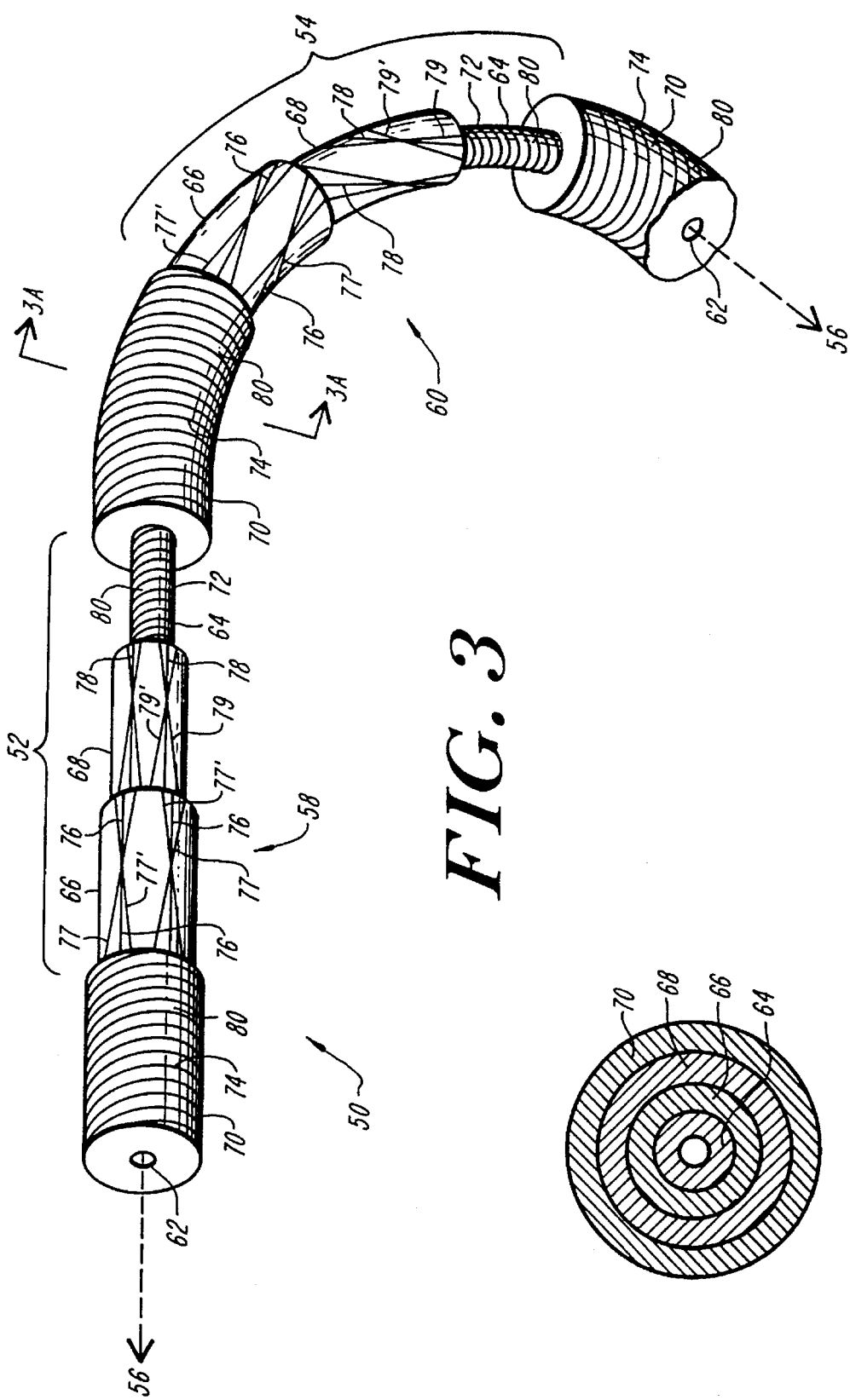
FIG. 3 is a perspective view, partially broken away, of a four-ply composite member constructed according to the invention and which has a selected axially-curved shape.
Figure 3A:
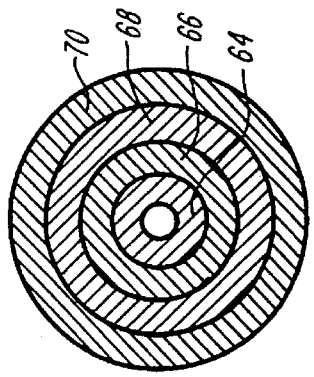
FIG. 3A shows a cross-sectional view of the composite member shown in FIG. 3.

FIGS. 3 and 3A, which are not to scale for illustrative purposes, show a tubular composite member 50 that is partially broken away at portions 52 and 54 to illustrate the interior plies. The tubular member 50 has an elongate axis 56 which has selected curvature: in region 58, the member 50 is substantially straight; and in region 60, the member 50 is curved. The axis 56 runs concentrically with the hollow central interior 62.

The member 10 has an interior ply 64, which is substantially the same as interior ply 12 of FIG. 1, a first intermediate ply 66, a second intermediate ply 68, and an exterior ply 70, which is substantially the same as exterior ply 16 of FIG. 1.

Interior ply 64 has a first helically oriented fiber component 72 that is preferably oriented at an angle of between seventy-five and ninety degrees relative to the axis 56. The fiber component 72 is preferably made from carbon, glass, or aramid materials, or mixtures thereof.

Exterior ply 70 likewise has a second helically oriented fiber component 74 that is preferably oriented at an angle of between seventy-five and ninety degrees relative to the axis 56. The fiber component 74 is preferably made from carbon, glass, or aramid materials, or mixtures thereof.

Intermediate plies 66 and 68 each have a tri-axially braided ply, with varying off-axis angle, such as described in connection with FIGS. 1 and 2D. Ply 66 has a first axially extending fiber component 76, with interlace fiber components 77, 77'; and ply 68 has a second axially extending fiber component 78, with interlace fiber components 79, 79'. It should be noted that intermediate plies show only two axially extending fiber components within each ply, for illustrative purposes, when in reality the axially extending fiber components, each with a pair of interlace fiber components, are radially spaced about the circumference of the ply selectively.

Shown in portion 52, the orientation of the tri-axially braided ply 66 within region 58 is substantially axial, i.e., with an off axis angle of approximately zero degrees. Thus, the first axially extending fiber component 76 has a first angle with respect to the axis 56 of approximately zero degrees. The interlace fiber 77 is oriented relative to the first angle and is between ten and sixty degrees; and the interlace fiber 77' is oriented relative to the first angle with an angle which is equal and opposite to the angle of interlace fiber 77.

The orientation of the tri-axially braided ply 68 is similar within region 58. Thus, the second axially extending fiber component 78 has a second angle with respect to the axis 56 of approximately zero degrees. The interlace fiber 79 is oriented relative to the second angle and is between ten and sixty degrees; and the interlace fiber 79' is oriented relative to the first angle with an angle which is equal and opposite to the angle of interlace fiber 79.

Shown in portion 54, the orientations of the tri-axially braided plies change because of the curvature of the member 50 in region 60. The first axially extending fiber component 76 has a first angle with respect to the axis 56 of greater than zero degrees, here shown as approximately forty-five degrees. The interlace fiber 77 remains oriented relative to the first angle with an angle between ten and sixty degrees; and the interlace fiber 77' likewise remains oriented relative to the first angle with an angle which is equal and opposite to the angle of interlace fiber 77.

The orientation of the tri-axially braided ply 68 is similar within region 60. The second axially extending fiber component 78 has a second angle with respect to the axis 56 which is equal and opposite to the first angle of fiber component 76 within the same region 60. Thus, fiber component 78 has an angle of approximately minus forty-five degrees illustrated within portion 54. The interlace fiber 79 remains oriented relative to the second angle with an angle between ten and sixty degrees; and the interlace fiber 79' likewise remains oriented relative to the second angle with an angle which is equal and opposite to the angle of interlace fiber 79.

Each of the fiber components within the plies 64,66,68,70 are disposed with a matrix material 80, such as earlier described. For example, a preferred matrix material is a high elongation, high strength, impact resistant material such as Nylon-6; and one suitable matrix material is B-staged thermoset. Other acceptable resins include thermosetting material such as epoxy, vinyl ester, or polyester. The axially extending fiber components 76, 78 are preferably made from carbon, glass, aramid, or mixtures thereof; and the interlace fiber components 77,77',79,79' are preferably made from glass, carbon, aramid, polyester, polyethylene, or mixtures thereof.

It should again be noted that although the variation of the first and second angles is preferred, it is not required according to the invention. For example, the tri-axially braided plies 66,68 can be constructed with constant, and opposite, off axis angles. One illustrated practice according to the invention, for example, is where the first angle is a constant angle selected between approximately ten and thirty degrees; and the second angle is a constant angle selected to be equal and opposite in sign to the first angle. Such a constant off-axis orientation alleviates the buckling and strain on the fiber components caused by bending within the region 60.

FIG. 4 illustrates another embodiment of the invention and which permits secondary reforming of the composite member into a selected axially-curved shape. More specifically, FIG. 4 shows an elongate composite member 90 which includes in inner core 92 of thermoplastic, at least one intermediate ply 94, and an external sheath 96 of thermoplastic. The layers 92, 94 and 96 are radially contiguous with each other, such as shown in FIG. 4A, and extend generally along the axis 98. The core 92 can be solid, or tubular, depending on the selected use of the member 90: for example, a tubular core may be used as pneumatic tubing or as a wind surfing boom; and a solid core may be used also as a boom or for other applications requiring increased strength, such as a helical spring. The member 90 is partially broken away in region 99 to illustrate the inner layers.

The intermediate ply is preferably constructed like the intermediate ply 14 of FIG. 1, or as any of the plies described in connection with 2A–2D, or with multiple sub-plies with a tri-axially braided ply configuration such as intermediate plies 66,68 of FIG. 3. However, the matrix material, e.g., the matrix material 80 of FIG. 3, which binds the intermediate ply together must have a melting temperature which is less than the core 92 or sheath 96. This permits secondary processing of the member 90 so that the member 90 may be reheated and formed into a selected axially-curved shape. The inner core 92 and outer sheath 96 can be heated into a state where the core and sheath are soft and pliable, while the melted intermediate ply is contained between the core and sheath. In this way, once the matrix material reaches a liquid state, the whole of the composite member 90 may be reformed by bending and without losing the cross-sectional form of the member, such as shown in FIG. 4A.

Accordingly, the composite member 90 of FIG. 4 is generally manufactured in an axially straight fashion, although not required, and whereafter the member 90 is heated and formed into a desired shape. The member 90 can be constructed with varying strength, as discussed earlier, by selecting the materials and the orientations of the fiber components within the intermediate ply 94.

Ply 94 may alternatively contain plurality of plies, such as the three-ply construction shown in FIG. 1, or the four-ply construction shown in FIG. 3. Accordingly, the helically oriented inner and outer plies, e.g., the interior ply 12 and exterior ply 16 of FIG. 1, include fiber components which are helically wound about the axis of the member and at an angle of between seventy-five and ninety degrees. In such a member, the multiple plies are sandwiched between the inner core 92 and outer sheath 96 to facilitate the secondary processing of the member 90. A member 90 constructed with the inner core and outer sheath further facilitates the manufacture of the member 90 through pultrusion processing, described in more detail below, so that the circumferential interior ply or plies may be "pulled" through the process.

FIG. 5 shows a cross-sectional view of a composite structure 100 constructed according to the invention which is preferably manufactured with a thermoplastic matrix, or a thermoset cured to an intermediate B stage, and which is formed straight by a pultrusion process, and then reheated and bent into a desired axially-curved geometry in a secondary processing operation. With particular reference to FIG. 5, the composite structure 100 includes an interior thermoplastic core 102, a composite intermediate ply 104, with sub-plies 104a and 104b, and an exterior thermoplastic sheath 106. Similar to the intermediate ply structure of FIG. 2E, the intermediate plies 104 can be made from the plies described in connection with FIGS. 2A–2D, or described and shown in connection with the intermediate ply 14 of FIG. 1. The sub-plies 104a and 104b preferably incorporate a helically braided ply structure such as illustrated in FIGS. 2B–2D. The interior core and outer sheath of thermoplastic are similar to the layers 92 and 96 illustrated in FIG. 4.

The manufacturing of other composite members according to the invention are best described by way of the following non-limiting examples. Further understanding of these manufacturing techniques may be obtained by reviewing U.S. Pat. No. 5,188,872, which is incorporated herein by reference, and which is particularly important for understanding Examples I and II below.

EXAMPLE I

Sailboard Boom Geometry

Figure 6:
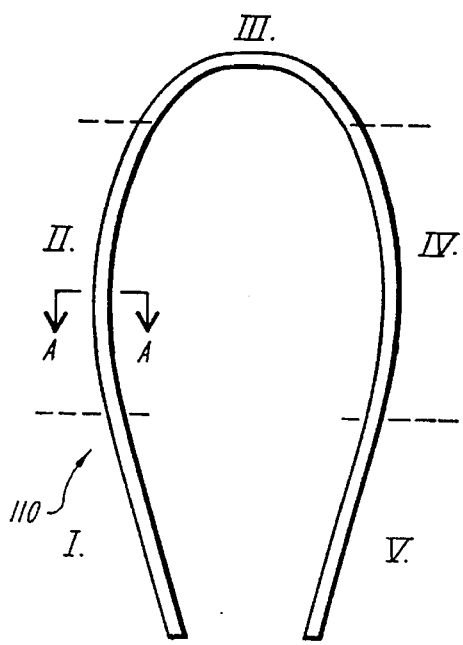
FIG. 6 shows a top view of a sailboard wind surfing boom constructed according to the invention.

The following details illustrate a design and method of manufacture of a an axially curved composite member, such a wind surfing boom 110 shown in FIG. 6. The length of the composite tubular member 110 is 340 cm, and the shape and dimensions of the tubular cross-section 112 are shown in FIG. 6A.

In FIG. 6, the fiber angles of the helically braided plies vary depending upon the selected curvature of the tubular structure illustrated in FIG. 6. The series of contiguous plies which form the member 110 are shown substantially in FIG. 3, or alternatively in FIG. 1. That is, there are a plurality of intermediate plies, or alternatively one intermediate ply, sandwiched between (i) an interior helically braided ply, with a first fiber component wound about the axis of the member 110 at an angle between seventy-five and ninety degrees, and (ii) an exterior ply, with a second fiber component wound about the axis of the member 110 at an angle between seventy-five and ninety degrees.

Figure 6A:
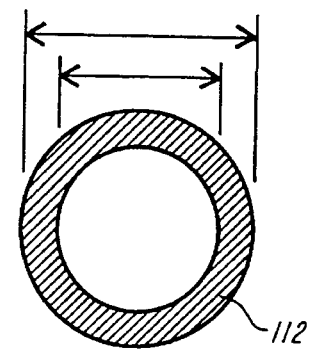
FIG. 6A shows a cross-sectional view of the boom of FIG. 6.

One suitable apparatus used to apply the several plies of FIGS. 6, 6A is shown and described in U.S. Pat. No. 5,188,872. In particular, the following description summarizes rotation rates of this apparatus in terms of "RPM", or revolutions per minute, for the intermediate ply, FIG. 1, or plies, FIG. 3.

In the straight regions of I & V, FIG. 6, the rate of rotation for the helical braiding is applied at zero RPMs. Accordingly, the helical braiding in those regions is substantially axial, such as illustrated in the intermediate plies in the region 58 of FIG. 3; and thus the first angle of the primary load-carrying fiber component, e.g., the fiber component 24,24' of FIG. 1 or the fiber components 76,78 of FIG. 3, is zero. Additionally, one or more pairs of interlace fiber components, e.g., the fibers 77,77' and 79,79' of FIG. 3, can be interlaced with the primary load-carrying fiber component.

In the slightly curved regions of II & IV, FIG. 6, the rate of rotation for the helical braid is applied at 3.9 RPMs. Accordingly, the helical braiding in those regions is provided with an off-axis angle, relative to the central axis of the member 110, of +/− fifteen degrees. Such a configuration of the fiber components is illustrated, for example, in the region 60 of FIG. 3, although the angle of orientation is reduced in this Example. Accordingly, the first and second angles of the primary load-carrying fiber components are plus and minus fifteen degrees, respectively.

In the curved region III, FIG. 6, the rate of rotation for the helical braid is the greatest, at 8.4 RPMs. Accordingly, the helical braiding in those regions is provided with an off-axis angle, relative to the central axis of the member 110, of +/− thirty degrees. Such a configuration of the fiber components is illustrated, for example, in the region 60 of FIG. 3, although, again, the angle of orientation is reduced in this Example. Accordingly, the first and second angles of the primary load-carrying fiber components are plus and minus thirty degrees, respectively.

It should be noted that the boom 110 is constructed by way of a flexible mandrel. That is, the multiple plies are formed onto an elongate, flexible mandrel with a matrix material, whereinafter the member is cured and the flexible mandrel is removed. The mandrel is flexible so that the uncured member may be curved into a selective axially-curved shape. The mandrel is also preferably formed by two joined components so that the mandrel may be removed from the interior of the boom 110 from both ends.

EXAMPLE II

Figure 7:
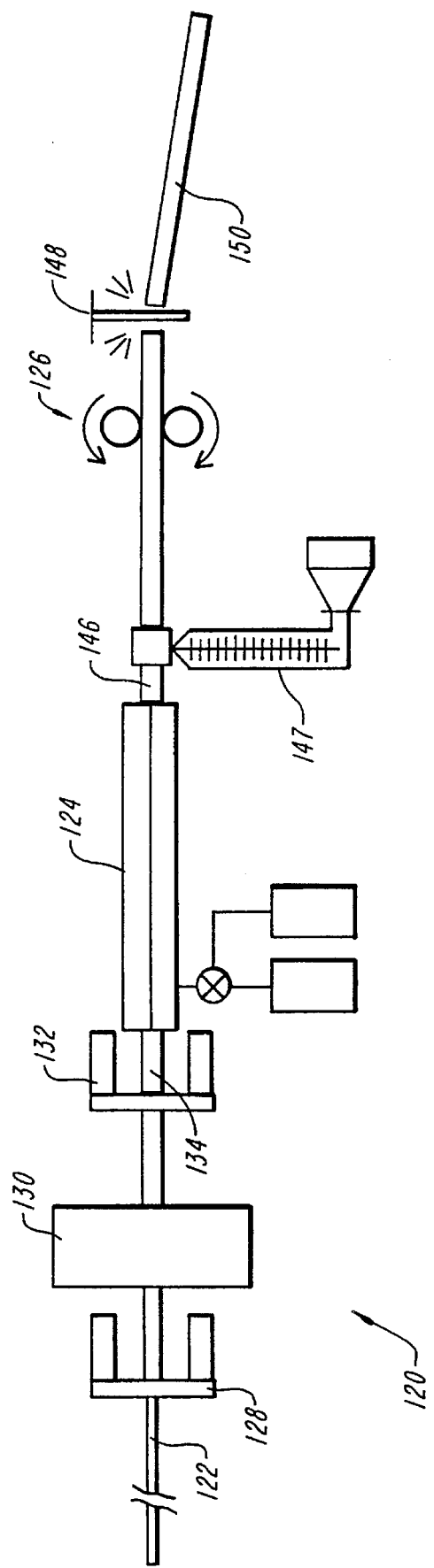
FIG. 7 is schematic side view of apparatus which includes a heated die and which is suitable for manufacturing a composite member such as the boom of FIG. 6.
Figure 8:
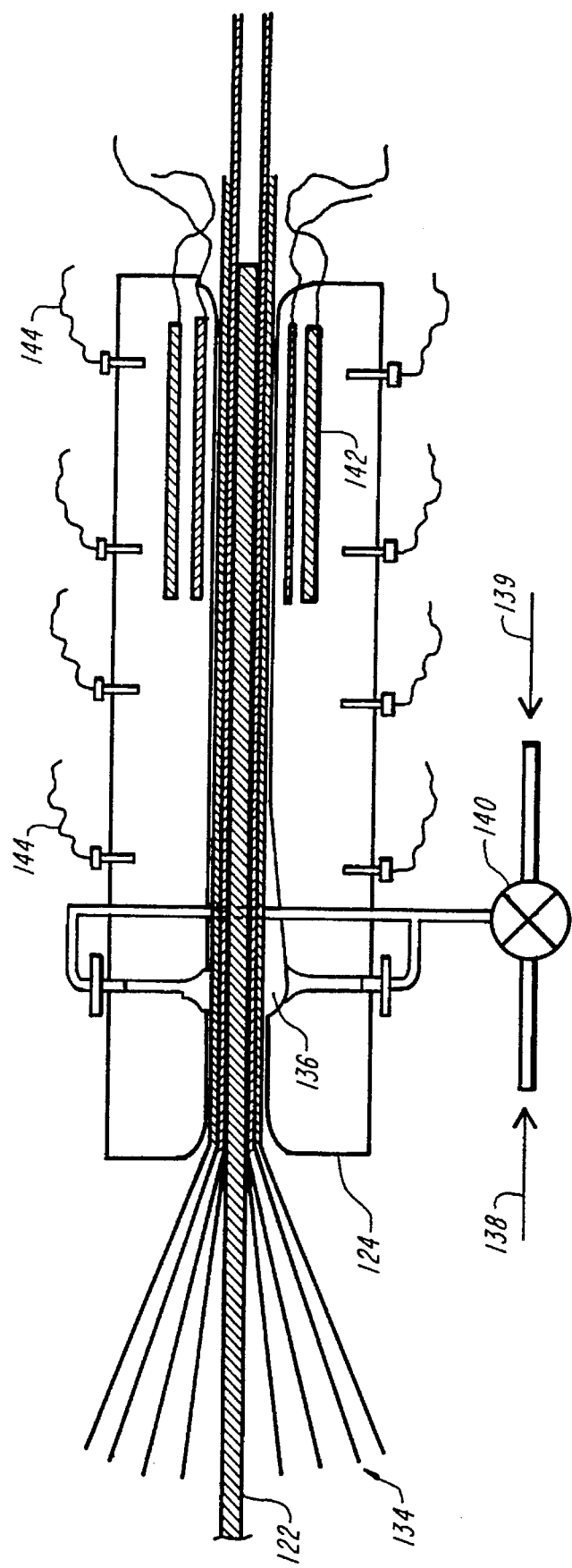
FIG. 8 is schematic side view of the heated die of FIG. 7.

Curved Tubular Member with Thermoplastic Matrix and Primary and Secondary Processing The following example, and associated FIGS. 7 and 8, illustrate a method of manufacture for constructing a continuous composite tubular member such as shown in FIG. 4 and which supports secondary processing to reform the member selectively into an axially-curved shape. The member is constructed, in part, with a thermoplastic matrix that is formed with the pultrusion process into a straight tube, and then reformed via a secondary process into a u-shaped or selectively curved tubular member.

The materials used to manufacture the tubular member of this example are listed in Table I.

TABLE I

| | |
|---|---|
| Exterior Sheath: | Copolyamide 6/66 |
| Supplier: | Du Pont and Nemours & Co. |
| Properties: | T melt = 500 Degree. F. |
| Exterior Ply: | |
| | |
| Component: | Exterior Ply |
| Material: | E-Glass |
| Type: | 675 Type 30 Roving |
| Supplier: | Owens-Corning |
| Properties: | Fiber Modulus = $10.5 \times 10^6$ psi, Density = 2.5 g/cm$^3$ |
| Intermediate Tri-Axial Helically Braided Ply: | |
| | |
| Component: | Braiding Yarn |
| Material: | S2-Glass |
| Type: | S2CG1501/3 |
| Supplier: | Owens-Corning |
| Properties: | Fiber Modulus = $12 \times 10^6$ psi, Density = 2.48 g/cm$^3$ |
| Component: | Axial Component in H-Braid Plies |
| Material: | Carbon Fiber |
| Type: | 12k G30500 |
| Supplier: | BASF |
| Properties: | Fiber Modulus = $34 \times 10^6$ psi, Density = 1.77 g/cm$^3$ |
| Interior Ply: | |
| | |
| Component: | Interior Ply |
| Material: | E-Glass |
| Type: | 675 Type 30 Roving |

TABLE I-continued

| | |
|---|---|
| Supplier: | Owens-Corning |
| Properties: | Fiber Modulus = $10.5 \times 10^6$ psi, Density = 2.5 g/cm$^3$ |
| Interior Tubular Core: | Copolyamide 6/66 |
| Supplier: | Du Pont and Nemours & Co. |
| Properties: | T melt = 500 Degree. F. |
| Matrix Material: | |
| Component: | Matrix Material |
| Material: | Nylon-6 Thermoplastic Resin anionic polymerization of ε-caprolactam using sodium caprolactamate catalyst and activator (100%:2%:2%) |
| Type: | Bruggolen C 10/Bruggolen C 20 |
| Supplier: | L. Bruggemann Chemical Company |
| Properties: | T melt = 400 Degree. F. |

FIG. 7 illustrates an apparatus 120 suitable for use in constructing the straight composite tube of this Example, such as the tubular member 90 of FIG. 4. The process begins with a continuous length of thermoplastic core, shown here as a tubular core 122, which is either pre-manufactured and supplied from a reel or extruded in-line during fabrication. Materials are drawn through the heated die 124 by a rotating or reciprocating pulling mechanism 126.

The pulling mechanism 126 draws the interior thermoplastic core 122 at a rate of approximately twelve inches per minute. The core 122 proceeds downstream into the first orbital winder 128. The orbital winder 128 applies circumferential glass windings at an angle of approximately 85° by rotating at 42 RPMs.

The intermediate load carrying fiber components enter the process at the helical braider 130, which includes a counter-clockwise rotating plate "A" (not shown), with guide rings and warp posts, and a clockwise rotating plate "B" (also not shown), with guide rings and warp posts. Seventy-two ends of carbon fiber are loaded onto plate "A" and passed over the guide rings and warp posts of braider "A" and rotated about the core 122 in a counter-clockwise direction at a speed of 1.18 RPMs to produce a helical angle of the carbon yarns of +15 degrees. Plate "A" also includes ends of fibers for the interlace fibers, and the braiding speed of plate "A" is thus 2.6 RPMs to provide an interlacing fiber with an interlacing angle of 37° in relation to the carbon fibers. The carbon fiber is stabilized and the fiber orientation maintained by the fine denier S2 glass braider yarns.

The fiber materials applied onto the thermoplastic core travel downstream from rotating plate "A" and into rotating plate "B" on the helical braider 130. Seventy-two ends of carbon fiber are loaded onto plate "B" and passed over the guide rings and warp posts of braider "B" and rotated about the core 122 in a clockwise direction at a speed of 1.18 RPMs to produce a helical angle of the carbon yarns of −15 degrees. Plate "B" also includes ends of fibers for the interlace fibers, and the braiding speed of plate "B" is thus 2.6 RPMs to provide an interlacing fiber with an interlacing angle of −37° in relation to the carbon fibers. The carbon fiber is stabilized and the fiber orientation maintained by the fine denier S2 glass braider yarns.

The interior and intermediate plies travel from the helical braider 130 into a second orbital winder 132. E-glass reinforcement on the orbital winder 132 is applied at a rate of 36 RPM to produce an exterior circumferentially wound fiber angle of −85° relative to the axis of the tube, e.g., the axis 98 of FIG. 4.

The completed preform 134 from the winder 132 is then pulled by the pulling mechanism 126 into a heated steel die 124 illustrated in FIG. 8. The steel die 124 is fabricated from 4140 tool steel, known to those skilled in the art, and consists of two halves forming a split cavity. It is machined and ground to form the external profile of the tube and the molded surfaces are plated with a 0.0015" thick layer of hard chrome. The die 124 is thirty-six inches long and is uniformly heated to 160° C. The entrance of the die 124 includes a machined injection port 136.

The matrix material is pumped into the die 124 and disposed with the formed fiber components in liquid form from two separate reservoirs (not shown): one reservoir contains a sodium caprolactamate and caprolactam (the catalyst side); and the other reservoir contains the activator and caprolactam. The two sides 138, 139 are blended at the mixhead 140 in equal proportions and pumped at approximately ten pounds-per-square-inch into the injection port 136 of the steel die 124. The low viscosity of the nylon matrix monomer impregnates the fiber preform 134. The elevated temperature of the die 124, created by the heaters 142 and monitored by the thermocouples 144, accelerates the polymerization of the caprolactam as the now-wetted preform travels through the die 124. The reaction and cure are completed before the composite member exits the die 124 resulting in a finished tube 146 which includes a high impact resistant fiber architecture that is preferably impregnated by thermoplastic Nylon-6 matrix.

With further reference to FIG. 7, the fully polymerized composite member 146 exits the die 124 so that it cools in ambient conditions. The member 146 is drawn by the pulling mechanism 126 and through the cross-head extruder 147 where a layer of Copolyamide 6/66 is extruded to provide an exterior sheath of thermoplastic. The part is then pulled further through the traveling cut-off saw 148. The cut-off saw 148 separates the composite member into units 150 that are 340 cm long, which are thereafter used in manufacturing the selectively curved composite member in a secondary process described below.

To form the tube into a u-shaped curved tubular composite, or into other selectively curved shapes, it is necessary to heat the straight tube to about 450 degrees F. At that point, the interior Nylon matrix material is molten while the interior core and exterior sheath remain malleable but contain the fluid interior matrix material. The tube is then bent into it's desired shape and held in a jig until it cools to about 250 degrees F. when it can be removed and allowed to cool to ambient temperature.

The resulting curved tubular member has the following properties:

weight of the tube=1197 g average laminate density=1.81 g/cm$^3$

Bending Stiffness of Tube=562.5 N-m$^2$

Figure 9:
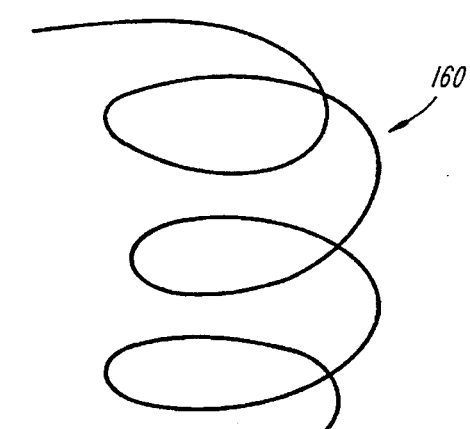
FIG. 9 is a perspective view of a helical spring constructed according to the invention.
Figure 10:
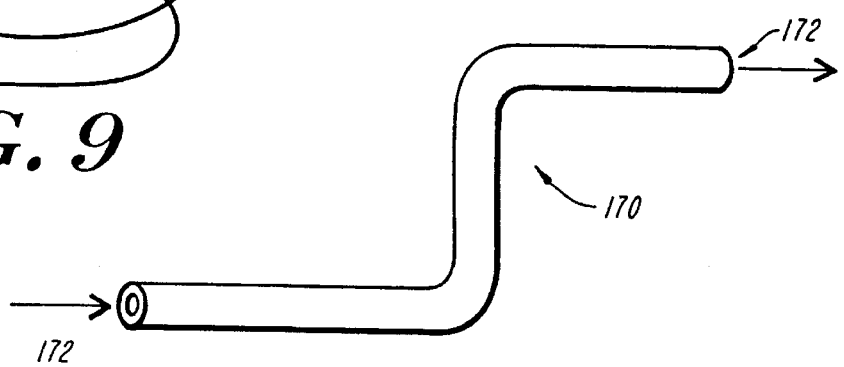
FIG. 10 is a perspective view of pneumatic tubing constructed according to the invention.

A completed tube manufactured as in Example II can be used in various applications. FIG. 9 for example shows a helical spring 160 which can be used to replace metal automobile springs. FIG. 10 shows pneumatic tubing 170 which is formed into an s-shape via secondary processing and which is hollow to provide a fluid conduit 172.

It should be apparent to those skilled in the art that the spring 160 and tubing 170 of FIGS. 9 and 10, respectively, can be manufactured with a variety of ply geometries and thicknesses to select the strength and characteristics for curving in a secondary process. For example, the ply geometries of FIGS. 2–3 may be used to strengthen the tubular member and to selectively alter the axial curvature for assorted applications.

The invention thus attains the objects set forth above, in addition to those apparent from preceding description. Since certain changes may be made in the above composite member structures without departing from the scope of the invention, it is intended that all matter contained in the above description or shown in the accompanying drawing be interpreted as illustrative and not in a limiting sense.

It is also to be understood that the following claims are to cover all generic and specific features of the invention described herein, and all statements of the scope of the invention which, as a matter of language, might be the to fall there between.

Having described the invention, what is claimed as new and secured by Letters Patent is:

1. A composite member having selected curvature along an axis of elongation, comprising at least one interior ply having a first fiber component and a polymer matrix material, said first fiber component being helically-oriented relative to said axis, at least one exterior ply having a second fiber component and a polymer matrix material, said second fiber component being helically-oriented relative to said axis, and at least one intermediate ply having a clockwise helically oriented fiber component, a counter-clockwise helically oriented fiber component, and a polymer matrix material, said clockwise helically oriented fiber component having a first angle of orientation relative to said axis substantially between zero and forty-five degrees, said counter-clockwise helically oriented fiber component having a second angle of orientation which is equal and opposite to said first angle, said first angle having selected different values along the length of said composite member such that said composite member has a bending stiffness that varies along said axis at selected different locations.

2. A composite member according to claim 1, wherein said first angle has selected different values along the length of said member, said value of said first angle being a function of said curvature wherein said first angle is greater at axial locations of increased curvature and lesser at axial locations of decreased curvature.

3. A composite member according to claim 1, wherein at least one of said first and second fiber components has a helical angle substantially between seventy-five and ninety degrees relative to said axis.

4. A composite member according to claim 1 having a bending stiffness along said axis and wherein said intermediate ply provides at least 80% of said bending stiffness.

5. A composite member according to claim 1 having a bending stiffness along said axis and wherein said first angle is variable substantially between zero and forty-five degrees to select said bending stiffness.

6. A composite member according to claim 1, further comprising at least one pair of interlace fibers interlaced with at least one of said helically oriented fiber components, said pair including a first interlace fiber component oriented at an angle substantially between ten and sixty degrees relative to the angle of said one helically oriented fiber component, said pair including a second interlace fiber component oriented relative to the angle of said one helically oriented fiber component with an angle that is equal and opposite to said first interlace fiber component, said interlace fibers being selected from the group consisting of glass, carbon, aramid, polyethylene, polyester, and mixtures thereof.

7. A composite member according to claim 1, wherein said intermediate ply further comprises a first interlace fiber component, a second interlace fiber component, a third interlace fiber component, and a fourth interlace fiber component, each interlace fiber components being selected from the group consisting of aramid, glass, linear polyethylene, polyethylene, polyester, carbon, and mixtures thereof, said first interlace fiber component being interwoven with said clockwise helically oriented fiber component and having a first interlace angle substantially between ten and sixty degrees relative to said first angle, said second interlace fiber component being interwoven with said clockwise helically oriented fiber component and having a second interlace angle that is equal and opposite in sign to said first interlace angle, said third interlace fiber component being interwoven with said counter-clockwise helically oriented fiber component and having a third interlace angle between substantially ten and sixty degrees relative to said second angle, said fourth interlace fiber component being interwoven with said counter-clockwise helically oriented fiber component and having a fourth interlace angle that is equal and opposite in sign to said third interlace angle.

8. A composite member according to claim 1 wherein said first fiber component and said clockwise helically oriented fiber component and said counterclockwise helically oriented fiber component are each selected from the group consisting of glass, carbon, aramid, and mixtures thereof.

9. A composite member according to claim 1, wherein said polymer matrix material is selected from the group of resin-based materials consisting of B-staged thermoset, nylon-6 thermoplastic, polyether-ether-ketone, polyphenylene sulfide, polyethylene, polypropylene, thermoplastic urethanes, epoxy, vinyl-ester, and polyester.

10. A composite member according to claim 1, further comprising at least one stitching fiber, said stitching fiber being interwoven with itself and with at least one of said fiber components.

11. A composite member according to claim 10, wherein said stitching fiber is selected from the group of fiber materials consisting of polyester, glass, carbon, aramid, and mixtures thereof.

12. A composite member according to claim 1, wherein said clockwise helically oriented fiber component is interwoven with said counter-clockwise helically oriented fiber component.

13. A composite member according to claim 1, wherein at least one of said fiber components comprises a plurality of interwoven fibers.

14. A composite member according to claim 1, further comprising, in said intermediate ply, a first clockwise helically oriented braiding yarn component and a second counter-clockwise oriented braiding yarn component, said first and second yarn components being interwoven with at least one of said fiber components of said intermediate ply.

15. A composite member according to claim 1, further comprising an outer sheath of thermoplastic disposed exterior to said exterior ply and an inner core of thermoplastic disposed interior to said interior ply, said thermoplastic outer sheath and inner core having a higher melting temperature than said matrix material, said composite member being capable of reformation at selected locations along said axis by heating and bending said composite member at said selected locations.

16. A composite member according to claim 15, wherein said inner core of thermoplastic is tubular.

17. A composite member according to claim 1, further comprising an inner core of thermoplastic disposed interior to said interior ply and wherein said exterior ply comprises a thermoplastic matrix material, said inner ply and said exterior ply both having a melting temperature higher than said polymer matrix material of said intermediate ply such that said composite member is formable into said selected axial curved shape by bending said composite member when heated.

18. A tubular composite member according to claim 17, wherein said first angle has selected different values along the length of said member, said value of said first angle being a function of the selected axially-curved shape of said composite member wherein said first angle is greater at axial locations of increased curvature and lesser at axial locations of decreased curvature.

19. A tubular composite member according to claim 17, further comprising at least one further ply disposed exterior to said inner ply and interior to said intermediate ply, said further ply having a first fiber component and a polymer matrix material, said first fiber component thereof being helically-oriented substantially between seventy-five and ninety degrees relative to the axis of said composite member and being selected from the group consisting of glass, carbon, aramid, and mixtures thereof.

20. A tubular composite member according to claim 17, further comprising at least one further ply disposed exterior to said intermediate ply and interior to said outer ply, said further ply having a second fiber component and said matrix material, said second fiber component thereof being helically-oriented substantially between seventy-five and ninety degrees relative to the axis of said composite member and being selected from the group consisting of glass, carbon, and aramid, and mixtures thereof.

21. A composite member according to claim 17, wherein said intermediate ply further comprises a first interlace fiber component, a second interlace fiber component, a third interlace fiber component, and a fourth interlace fiber component, each interlace fiber components being selected from the group consisting of aramid, glass, linear polyethylene, polyethylene, polyester, carbon, and mixtures thereof, said first interlace fiber component being interwoven with said clockwise helically oriented fiber component and having a first interlace angle of ten to sixty degrees relative to said first angle, said second interlace fiber component being interwoven with said clockwise helically oriented fiber component and having a second interlace angle relative to said first angle that is equal but opposite in sign to said first interlace angle, said third interlace fiber component being interwoven with said counter-clockwise helically oriented fiber component and having a third interlace angle of ten to sixty degrees relative to said second angle, said fourth interlace fiber component being interwoven with said counter-clockwise helically oriented fiber component and having a fourth interlace angle relative to said second angle that is equal but opposite in sign to said third interlace angle.

22. A composite member according to claim 17, further comprising at least one pair of interlace fibers interlaced with at least one of said helically oriented fiber components, said pair including a first interlace fiber component oriented at an angle of between ten to sixty degrees relative to the angle of said one helically oriented fiber component, said pair including a second interlace fiber component oriented relative to the angle of said one helically oriented fiber component with an angle that is equal but opposite in sign to said first interlace fiber component.

23. A composite member according to claim 17, wherein said intermediate ply comprises a first intermediate ply having a first axially extending fiber component, first and second interlace fiber components interlaced with said first axially extending fiber component, and a polymer matrix material, said first axially extending fiber component having a first angle of orientation substantially between zero and forty-five degrees relative to the axis of said composite member, said first interlace fiber component oriented at an angle substantially between ten and sixty degrees relative to said first angle of orientation, said second interlace fiber component oriented relative to said first angle of orientation at an angle that is equal and opposite to said first interlace fiber component, said first axially extending fiber component being selected from the group consisting of carbon, aramid, glass, and mixtures thereof, said first and second interlace fibers being selected from the group consisting of glass, carbon, aramid, polyethylene, polyester, and mixtures thereof, and a second intermediate ply having a second axially extending fiber component, third and fourth interlace fiber components interlaced with said second axially extending fiber component, and a polymer matrix material, said second axially extending fiber component having a second angle of orientation relative to said axis that is equal and opposite to said first angle of orientation, said third interlace fiber component oriented at an angle substantially between ten and sixty degrees relative to said second angle of orientation, said fourth interlace fiber component oriented relative to said second angle of orientation at an angle that is equal and opposite to said third interlace fiber component, said second axially extending fiber component being selected from the group consisting of carbon, aramid, glass, and mixtures thereof, said third and fourth interlace fibers being selected from the group consisting of glass, carbon, aramid, polyethylene, polyester, and mixtures thereof.

24. A composite member having selected curvature along an axis of elongation, comprising at least one interior ply having a first fiber component and a polymer matrix material, said first fiber component being helically-oriented relative to said axis, a first intermediate ply having a first axially extending fiber component, first and second interlace fiber components interlaced with said first axially extending fiber component, and a polymer matrix material, said first axially extending fiber component having a first angle of orientation relative to said axis substantially between zero and forty-five degrees, said first interlace fiber component oriented at an angle substantially between ten and sixty degrees relative to said first angle of orientation, said second interlace fiber component oriented relative to said first angle of orientation at an angle that is equal and opposite to said first interlace fiber component, a second intermediate ply having a second axially extending fiber component, third and fourth interlace fiber components interlaced with said second axially extending fiber component, and a polymer matrix material, said second axially extending fiber component having a second angle of orientation relative to said axis that is equal and opposite to said first angle of orientation, said third interlace fiber component oriented at an angle substantially between ten and sixty degrees relative to said second angle of orientation, said fourth interlace fiber component oriented relative to said second angle of orientation at an angle that is equal and opposite to said third interlace fiber component, at least one exterior ply having a second fiber component and said matrix material, said second fiber component being helically-oriented relative to said axis, and said first and second angles having selected different values along the length of said composite member such that said composite member has a bending stiffness that varies along said axis at selected different locations.

25. A composite member according to claim 24, wherein said first angle of orientation has selected different values along the length of said member, said value of said first angle of orientation being a function of said curvature wherein said first angle is greater at axial locations of increased curvature and less at axial locations of decreased curvature.

26. A composite member according to claim 24, wherein at least one of said first and second fiber components has a helical angle substantially between seventy-five and ninety degrees relative to said axis.

27. A composite member according to claim 24 wherein said first and second fiber components and said first and second axially extending fiber components are selected from the group consisting essentially of glass, carbon, aramid, and mixtures thereof, and said first, second, third, and fourth interlace fibers are selected from the group consisting essentially of glass, carbon, aramid, polyethylene, polyester, and mixtures thereof.

* * * * *